(12) United States Patent
Tully

(10) Patent No.: US 10,655,889 B2
(45) Date of Patent: May 19, 2020

(54) APPLIANCE MOUNT FOR EXPANDABLE SHELTER

(71) Applicant: Berg Companies, Inc., Spokane, WA (US)

(72) Inventor: Travis Tully, Spokane, WA (US)

(73) Assignee: Berg Companies, Inc., Spokane, WA (US)

( * ) Notice: Subject to any disclaimer, the term of this patent is extended or adjusted under 35 U.S.C. 154(b) by 139 days.

(21) Appl. No.: 15/910,635

(22) Filed: Mar. 2, 2018

(65) Prior Publication Data
US 2019/0271486 A1 Sep. 5, 2019

(51) Int. Cl.
*F24F 13/32* (2006.01)
*E04H 1/12* (2006.01)
*A47B 46/00* (2006.01)
*F16M 13/02* (2006.01)
*E04B 1/343* (2006.01)

(52) U.S. Cl.
CPC ............... *F24F 13/32* (2013.01); *A47B 46/00* (2013.01); *E04H 1/12* (2013.01); *F16M 13/02* (2013.01); *E04B 1/34336* (2013.01); *E04H 2001/1283* (2013.01)

(58) Field of Classification Search
CPC ......... F16M 13/02; A47B 46/00; F24F 13/32; E04B 1/34357; E04B 1/34336; E04H 1/12; E04H 2001/1283; E04H 1/1205; E04H 3/08
See application file for complete search history.

(56) References Cited

U.S. PATENT DOCUMENTS

| | | | | |
|---|---|---|---|---|
| 2,891,754 A | * | 6/1959 | Kuhlenschmidt | F24F 13/32 248/208 |
| 4,498,374 A | * | 2/1985 | Gibson | F24F 13/32 454/204 |
| 4,510,852 A | * | 4/1985 | Sorrentino | F24F 13/32 454/204 |
| 5,112,015 A | * | 5/1992 | Williams | F16M 13/022 248/228.3 |
| 5,469,807 A | * | 11/1995 | Kosmaczeska | B65D 21/086 |
| 5,582,025 A | * | 12/1996 | Dubin | F24F 1/0003 248/544 |
| 5,967,478 A | * | 10/1999 | Tynes | A47B 45/00 248/208 |
| 8,584,998 B1 | * | 11/2013 | Peterson | F24F 13/32 182/62 |

(Continued)

*Primary Examiner* — Babajide A Demuren
(74) *Attorney, Agent, or Firm* — Fay Sharpe LLP

(57) ABSTRACT

A wall mountable assembly including a mount and an insert. The mount may include an interior frame, an exterior frame, and an opening extending between the interior frame and the exterior frame. Channels may be coupled to the exterior frame and/or the interior frame. The insert may operably engage with the mount and transition between a stowed position and a deployed position. The insert may include a cover having a face plate, a top, a bottom, and tapered sidewalls extending between the top of the cover and the bottom of the cover. Slides of the cover may be configured to operably engage with the channels. In the stowed position the tapered sidewalls of the insert may be separated from the interior frame while in the deployed position the tapered sidewalls may be substantially flush with the interior frame.

19 Claims, 12 Drawing Sheets

(56) References Cited

U.S. PATENT DOCUMENTS

| | | | |
|---|---|---|---|
| 9,303,895 B1* | 4/2016 | Grant | F24F 13/32 |
| 9,388,999 B2* | 7/2016 | De Jesus | E06B 7/28 |
| 10,295,221 B2* | 5/2019 | Zhang | F24F 13/32 |
| 2015/0097096 A1* | 4/2015 | Arbucci | E06B 7/28 |
| | | | 248/208 |
| 2017/0089594 A1* | 3/2017 | Small, III | A47C 27/081 |
| 2017/0297768 A1* | 10/2017 | Gamboa | B65D 21/086 |
| 2019/0011142 A1* | 1/2019 | Entrekin | F24F 7/013 |

* cited by examiner

APPLIANCE MOUNT FOR EXPANDABLE SHELTER

BACKGROUND

Expandable shelters have been developed for transportation to remote sites where they are then set-up for use. For instance, expandable shelters may be used as barracks, field hospitals, mess halls, kitchens, relief shelters, communication centers, or laboratories and may be deployed in extreme environments (e.g., deserts, the arctic, etc.). They may be transported by air, land, or sea, and in some instances, may be stackable. When deployed, walls of the expandable shelter may expand to create a significantly larger operating footprint than when transported. During both transportation and when deployed, however, the size of the expandable shelter is often significant. For instance, the size of the expandable shelter may impact ease of transportation and/or other logistics. In addition, the rate at which the expandable shelters are configured to transition between stowed and deployed states is often crucial in order to reduce set-up time.

To accommodate for their range of different environments and purposes, expandable shelters may have air-conditioners, heaters, or other heating ventilation and air conditioning (HVAC) appliances that cool, heat, and/or condition an interior space of the expandable shelter. However, these appliances are often heavy, bulky, not easily secured during transport, and when integrated into an expandable shelter, are not easily transitioned between stowed and deployed states. Making the appliances configurable between stowed and deployed states may increase the footprint of the shelter, may create challenges to securing the appliances during transportation, and when deployed, and/or may add to manual labor involved in stowing and deploying the expandable shelter. As a result, appliances in existing expandable shelters may take considerable time and personnel to setup.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
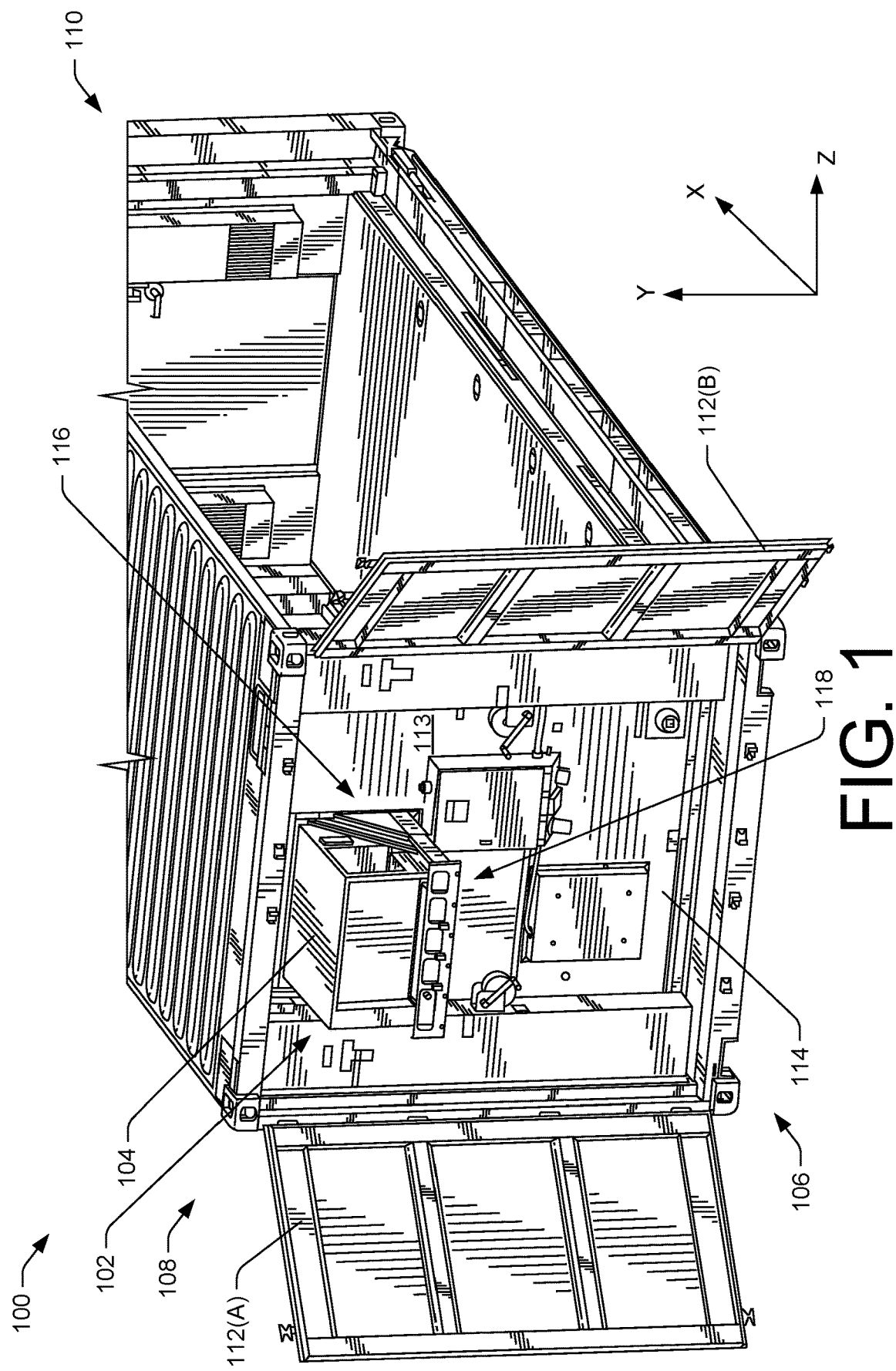
FIG. 1 is perspective view of an exterior of an example expandable shelter, showing an example appliance mount in a deployed state, with doors of the example expandable shelter in an open position.

As discussed above, existing expandable shelters, or other moveable-type shelters, may lack efficient mechanisms for transitioning between a stowed state and a deployed state. For instance, an air-conditioning unit that provides cold air to an interior space of the expandable shelter may not be easily set-up when deploying the expandable shelter and conversely, may not be easily retracted when collapsing or deconstructing the expandable shelter. Accordingly, many existing expandable shelters require large amounts of manual labor when securing appliances, such as an air-conditioner, both during transportation and when setting up the expandable shelter. In addition, challenges may arise safely securing heavy or bulky appliances during transport. Air-conditioners, for example, may have to be physically lifted through an opening in a wall of the expandable shelter and thereafter secured using clamps or other fasteners. During transport, the air-conditioner may have to be removed from the wall and secured using straps, brackets, or alternate equipment. However, the amount of time and energy spent tending to these appliances detracts from the utility of the expandable shelter. As such, when deployed in a harsh environment, such as a desert, speed and simplicity of stowing and deploying may be a highly valued feature of an expandable shelter.

Furthermore, expandable shelters that integrate capabilities of easily transitioning between stowed and deployed states may sacrifice a compact footprint. For instance, mounts or other brackets that permit appliances to transition between stowed and deployed states may be bulky. As footprints of expandable shelters increase, or as the footprints become irregular, the expandable shelter may not be as easily transported. Furthermore, the footprint may affect an ability of the expandable shelter to integrate or interconnect with other expandable shelters or enclosures.

In light of the above, this application describes an appliance mount for expandable shelters that may be configured to easily transition between a stowed or retracted state, such as when the expandable shelter is being transported, and a deployed or extended state, such as when the expandable shelter is set-up and expanded. Compared to existing methods or mounts, the appliance mount according to this application may safely secure appliances both during transport and when deployed, may require minimal manual labor when stowing and deploying, and may maintain existing footprints of the expandable shelter during transportation.

Although this application discusses the appliance mount in use with an air-conditioner the appliance mount may be used with other appliances as well, such as refrigerators, heaters, furnaces, generators, ovens, fume hoods, and televisions, to name a few, or may more generally be used as a mount that extends and retracts any object between stowed and deployed states or positions.

In some instances, appliance mounts according to this application may include a frame or mount coupled to a wall or a surface of the expandable and an insert that operably engages, couples, connects and slides or otherwise moves within the frame. In combination, the engagement and interaction between the insert and the frame may allow appliances situated within the insert of the appliance mount to transition between a stowed state and a deployed state. As discussed in more detail herein, an engagement between the frame and the insert may allow the insert to be pushed and/or pulled into stowed and deployed states, thereby moving the appliance between stowed and deployed states.

Beginning with the frame of the appliance mount, in some instances, the frame may include an exterior frame and an interior frame. In some instances, the exterior frame may mount to an exterior of the expandable shelter while the interior frame may mount to an interior of the expandable shelter. The exterior frame and/or the interior frame may mount to an expandable side of the expandable shelter and/or fixed or non-expandable sides of the expandable shelter.

To receive the insert, openings may be disposed through the exterior frame and/or the interior frame. An opening of the exterior frame may align with an opening of the interior frame to form a common opening therebetween that accommodates the insert.

In some instances, the exterior frame and/or the interior frame may include flanges that position, align, or assist in mounting or otherwise coupling the exterior frame and/or the interior frame to the expandable shelter. The flanges of the exterior frame and/or the interior frame may center the exterior frame and/or the interior frame within the opening of the expandable shelter to form the opening through which the insert is disposed.

The frame may include channels, passageway, slots, attachment mechanisms, or other engagement members configured to receive the insert of the appliance mount. The interaction between the frame, via the channels, and the insert may allow the air-conditioner or other appliance, via movement of the insert within the channels, to transition between stowed and deployed states. In some instances, the channels may be included on either one or both of the exterior frame and/or the interior frame.

The channels may extend transversely relative to the frame, the opening in the expandable shelter, or the exterior of the expandable shelter. In some instances, the channels may be angled or sloped away from the expandable shelter or relative to the exterior frame and/or the interior frame, between the first ends of the channels and the second ends of the channels. In some instances, this slope may be relative to flanges of the exterior frame and/or the interior frame, the interior surface of the expandable shelter, or the exterior surface of the expandable shelter. The inclusion of the slope may angle the insert away from the expandable shelter. Accordingly, given that air-conditioners in some environments create condensation, the slope may help funnel or route water or other moisture away from the expandable shelter. The slope of the channels may therefore allow condensation and precipitation to safely run-off and away from the expandable shelter. Moreover, the slope may retain the insert in the deployed state.

Moving to the insert of the appliance mount, the insert may include a base, a top, sidewalls, and an opening. The opening may be sized to receive the air-conditioner, or other appliance, while similarly, a width of the base as well as the length of the base may also be sized to receive dimensions of the air-conditioner. When positioned on the insert, the air-conditioner may be arranged to receive air exterior to the expandable shelter and dispense conditioned air into the interior of the expandable shelter.

The base of the insert may include strips that offset the air-conditioner from the base in order to prevent the air-conditioner from scratching or damaging the base and the insert. In addition, the strips may form passageways, between the base and the air-conditioner, to allow condensation to flow away from the expandable shelter.

In some examples, the strips may also help retain the air-conditioner within the insert, via a tackiness or high coefficient of friction of the strips, as compared to a material of the base. In some examples, the strips may have a lower coefficient of friction to allow the air-conditioner to slide easily across the insert.

As indicated previously, the insert may be sized to be insertable through the opening of the frame, thereby allowing the insert to operably transition between stowed and deployed states within the frame. To align and position the insert within the frame, coupled to the sidewalls of the base of the insert may be rails or slides that engage with the channels of the frame. In some instances, the slides may be directly integrated with the insert or may be separate features coupled thereto.

A length of the slides may be sized longer than the length of the channels. In doing so, the slides may be permitted move within the channels such that portions or ends of the slides may be exposed beyond ends of the channels.

Returning to the channels and the opening of the frame (i.e., the opening formed by the opening of the exterior frame and the opening of the interior frame), a first portion of the opening may have a width that is smaller than a second portion of the opening. In some instances, the first portion of the opening may be sized to receive the width of the base of the insert, but not the width of the base of the insert and the width of the slides coupled thereto. The second portion of the opening may be sized to receive the width of the base of the insert and a width of the slides of the insert.

The insert may have a cover coupled to the base, the top, the sidewalls, and/or the slides of the insert. The cover may include a front, a top, a bottom, sidewalls extending between the top and the bottom, and an opening. In some instances, the base, the sidewalls of the base, and the slides may couple to the cover at a location interior to the top, the bottom, and/or the sidewalls of the cover.

The sidewalls of the cover may include a taper that enlarges from the top of the cover towards the bottom of the cover. The angle of the taper included in the sidewalls may be substantially equivalent or equal to the slope or angle at which the channels are disposed in the frame of the appliance mount. In some instances, the sidewalls are tapered such that the sidewalls are larger proximate to the bottom of the cover than proximate the top of the cover. The taper may allow the cover to abut the interior surface of the expandable shelter and/or the interior frame and to seal against water, dust, or other contaminants leaking into the shelter, and to prevent or at least minimize light and heat from leaking out of the shelter.

Opposite the cover and on the second end of the insert may be a back plate coupled to the base, the sidewalls, and/or the slides. The back plate may prevent the insert from disengaging with the frame. The size of the back plate, or portions of the back plate, may permit the slides to insert within the channels, between stowed and deployed states, but may prevent the slides from disengaging with the channels.

Turning to the engagement between the frame and the insert, and beginning in the stowed state, the back plate of the insert may abut the second end of the channels. The relative size of the back plate, as well as its engagement with the second end of the channels may prevent the insert from advancing farther into the channels and into the interior of the expandable shelter.

In the stowed state, to prevent the back plate from advancing in a direction opposite to the interior of the expandable shelter, the back plate may abut other portions of the expandable shelter. For instance, while being transported, cargo doors of the expandable shelter may be closed such that an interior surface of the cargo doors abuts the back plate and prevents the insert from advancing away from the interior of the expandable shelter. To cushion the interaction between the back plate and the cargo doors, or to reduce vibrations during transport, bumpers or pads may be included on the back plate and/or the cargo doors.

While in the stowed state, the top, the bottom, and the sidewalls of the cover may be disposed or separated from an interior surface of the expandable shelter. Accordingly, in the stowed position, the insert may be prevented from advancing inward, towards the interior of the expandable shelter, via an interaction between the back plate and the second end of the channels, while simultaneously, the insert may be prevented from advancing outward, in a direction away from the interior of the expandable shelter, via an interaction between the back plate and a surface of the cargo doors. In this sense, the insert, and therefore the air-conditioner residing within the insert may be secured within the insert during transport of the expandable shelter and may not be permitted to move in directions away from the expandable shelter and/or towards the expandable shelter. However, while the cargo doors are discussed as preventing the insert from moving in the outward direction, other brackets, plates, fasteners, straps or locks may additionally or alternatively be used.

In the deployed state the cargo doors of the expandable shelter may be opened to allow the insert to advance in a direction outward from the interior of the expandable shelter. That is, as the back plate of the insert no longer abuts the cargo doors, the insert may move in a direction away from the interior of the expandable shelter.

The insert may be slid or pushed, for instance, via applying force to the cover of the insert until the top, the bottom, and the sidewalls of the cover abut the interior surface of the expandable shelter and/or the interior frame. In this position, the appliance mount may be in the deployed state as the insert is prevented from advancing father away from the interior of the expandable shelter, via the cover abutting the interior of the shelter and/or the interior frame. That is, in the deployed position and when the cover abuts the interior surface and/or the interior frame, the insert may be prevented from advancing further in a direction away from the interior of the expandable shelter. Being as the insert is extended out of the interior of the appliance mount, the interior space of the expandable shelter may be increased.

While in the deployed state, the insert may be advanced into the interior of the expandable shelter. However, the amount the insert may be advanced inwards towards the interior of the expandable shelter may be limited by the back plate interacting with the second end of the channels. In this sense, the back plate may prevent the insert from falling into the interior of the expandable shelter. In some instances, locks or other connectors may be included to prevent the insert from advancing in a direction towards the interior of the expandable shelter when in the deployed position.

In the deployed state, the inclusion of the taper on the sidewalls may allow the sidewalls of the cover to couple or abut to the interior surface of the expandable shelter and/or the interior frame. In some instances, the sealing of the cover against the interior surface and/or the interior frame may prevent comtaminants, such as dirt or other debris, from entering the expandable shelter, as well as heat and/or light from escaping an interior of the expandable shelter. In addition, the relational coupling of the cover to the insert may prevent disturbances interposed between the cover and the interior surface of the expandable shelter and/or the interior frame.

To seal or close off any gap between the cover and the interior surface of the expandable shelter or the interior frame, a gasket may be disposed around a perimeter of the cover, such as a perimeter formed by the top, the bottom, and the sidewalls of the cover. In addition, to provide water-tight or to thermally insulate gaps between the appliance mount and the expandable shelter, or similarly the insert and the frame, padding or other barriers may be included.

While the above appliance mount has been discussed with reference to the frame including the exterior frame and the interior frame, in some instances, the appliance mount may use only one of the exterior frame and/or the interior frame. In these instances, one of the exterior frame or the interior frame may respectively include the opening and the channels for receiving the insert as well as mounting flanges or brackets to secure the exterior frame or the interior frame to the expandable shelter. For instance, the appliance mount may include the exterior frame including an opening, a flange, and channels, among other features. The exterior frame may be aligned over an opening in the expandable shelter and coupled thereto, either on an exterior and/or interior thereof. The slides of the insert may operably engage with the channels of the exterior frame. However, in some instances, because the interior frame is excluded, in this example, the exterior frame may include reinforcement to carry the weight of the insert and/or the air-conditioner. For instance, this reinforcement may come by way of additional fasteners to secure the exterior frame to the expandable shelter.

FIG. 1 illustrates a perspective view of an example expandable shelter 100. The expandable shelter 100 may have an appliance mount 102 that houses an air-conditioner 104. In some instances, the appliance mount 102 may be positioned within a mechanical compartment 106 located at a back end 108, opposite a front end 110, of the expandable shelter 100. The mechanical compartment 106 may be accessed via two louvered doors 112(A) and 112(B). When opened, such as shown in FIG. 1, the louvered doors 112(A) and 112(B) may provide access to the air-conditioner 104 and may allow the appliance mount 102 to transition to the deployed state. In operation, exhausted air from the air-conditioner 104 may be dispelled exterior to the expandable shelter 100.

Sides may extend between the back end 108 and the front end 110 of the expandable shelter 100. However, the near side is shown as being transparent or translucent to illustrate the interior of the expandable shelter 100. In some instances, the expandable shelter 100 may be at least partially constructed from a standard shipping container (e.g., intermodal freight container) formed of metal (e.g., steel). For instance, the expandable shelter 100 may be a standard shipping container modified to include the sides, the mechanical compartment 106, electrical components, plumbing, insulation, etc. In addition, given that the expandable shelter 100 may be constructed from a standard shipping container, the expandable shelter 100 may have dimensions similar to that of standard shipping containers in the stowed state.

The sides may be displaceable in order to expand the expandable shelter 100 from a stowed or storage state for shipping to a deployed state for use. During a stowed state, the sides may include a plurality of hard and/or soft panels that may be folded, rolled, or otherwise collapsed into a frame of the expandable shelter 100, within the footprint of the standard shipping container, and unfolded during deployment. For instance, the sides may include a movable portion including an insulated ceiling panel that may fold up to a position coplanar with a top of the expandable shelter 100. Two side wall panels may fold out and become coplanar with the ends (e.g. the back end 108 and the front end 110, respectively) of the expandable shelter 100. The two side walls, in the deployed state, may act as trusses to support the ceiling panel, providing structural support while enlarging the interior footprint or area by the expandable shelter 100. A floor panel may be included in the sides which folds down to a position coplanar with the bottom of the expandable shelter 100. In some instances, a winch and cable system may be employed to ease the lowering of the floor panel. A back wall panel may also be included that folds up from the floor panel, pivoting on the floor panel outer edge to which the back wall panel bottom edge is coupled. Once fully deployed, the back wall panel may provide truss support similar to that of the side wall panels discussed above.

By utilizing a hard-sided panel system for the sides, the expandable shelter 100 may be deployed quickly and with considerable strength and insulating properties. The panels of the sides may include structurally insulated panels (SIPs) which, in some instances, may include at least a layer of insulation material sandwiched between two thin outer skins made of structural materials.

Consistent with ISO and/or other standards, the expandable shelter 100 may include structural features such as slots or other openings that enable the frame to be readily transported by forklift, crane, or helicopter, for instance.

In some instances, the appliance mount 102 may be mounted to a non-expandable side of the expandable shelter, such as a wall 113 disposed within the mechanical compartment 106.

FIG. 1 illustrates the appliance mount 102 in a deployed state. Discussed in more detail, the appliance mount 102 may include an exterior frame 116 coupled to an exterior surface 114 of the wall 113 and an insert 118 that operably engages with the exterior frame 116. In some instances, the exterior frame 116 may be integrated into the expandable shelter 100 or may be coupled thereto using mechanical fasteners. A footprint of the air-conditioner 104 may be sized to reside within the insert 118.

In the deployed state, the louvered doors 112(A) and 112(B) may be opened to allow the insert 118 to be advance in a direction away from an interior of the expandable shelter 100 (hereinafter, the "first direction"). That is, as shown and discussed in more detail later herein with reference to FIG. 3, when the louvered doors 112(A) and 112(B) are closed, the insert 118 may be prevented from advancing in the first direction. Accordingly, in the deployed state as shown in FIG. 1, the insert 118 may extend past the back end 108 of the expandable shelter 100. In some instances, in the deployed state, the insert 118 may increase the footprint of the expandable shelter 100.

Figure 2:
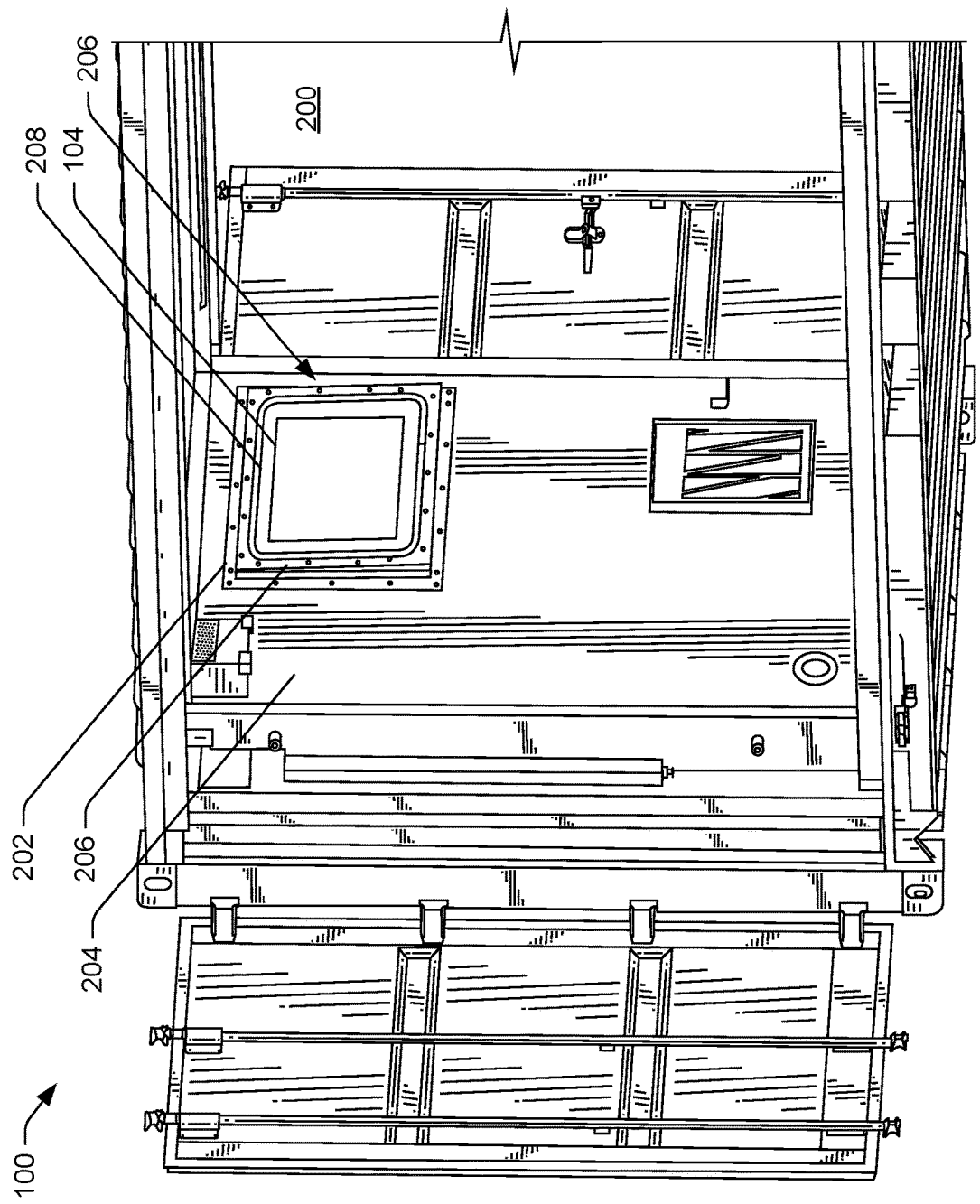
FIG. 2 is a perspective view of an interior of the example expandable shelter of FIG. 1, showing the example appliance mount in the deployed state.

FIG. 2 illustrates an interior 200 of the expandable shelter 100, showing the appliance mount 102 in the deployed state. As shown, and in conjunction with FIG. 1, the appliance mount 102 may be disposed through a wall of the expandable shelter 100 such that the air-conditioner 104 positioned in the insert 118 is arranged to receive air external to the expandable shelter 100 and dispel conditioned air within the interior 200 of the expandable shelter 100. The wall may define a barrier between the interior 200 of the expandable shelter 100 and an exterior of the expandable shelter 100. More particularly, FIG. 2 illustrates that in some instances, the appliance mount 102 may include an interior frame 202 mounted to an interior surface 204 of the wall of the expandable shelter 100.

In some instances, the interior frame 202 may couple or mount to the exterior frame 116 such that the wall of the expandable shelter 100 is interposed between the interior frame 202 and the exterior frame 116.

The insert 118 may include a cover 206 disposed within the interior 200 of the expandable shelter 100. In the deployed stated, the cover 206 may abut, couple, or contact the interior frame 202 and/or the interior surface 204 of the wall of the expandable shelter 100. That is, in the deployed state, the insert 118 may be advanced all the way in the first direction such that the cover 206 of the inserts 118 contacts the interior frame 202 and/or the interior surface 204. As such, the insert 118 may be prevented from advancing all the way out of the interior 200 of the expandable shelter 100 and disengaging with the exterior frame 116.

FIG. 2 also illustrates that the cover 206 may have an opening 208. In some instances, the opening 208 may provide access to control of the air-conditioner 104 and/or may provide a passageway for conditioned air to reach the interior 200 of the expandable shelter 100.

Figure 3:
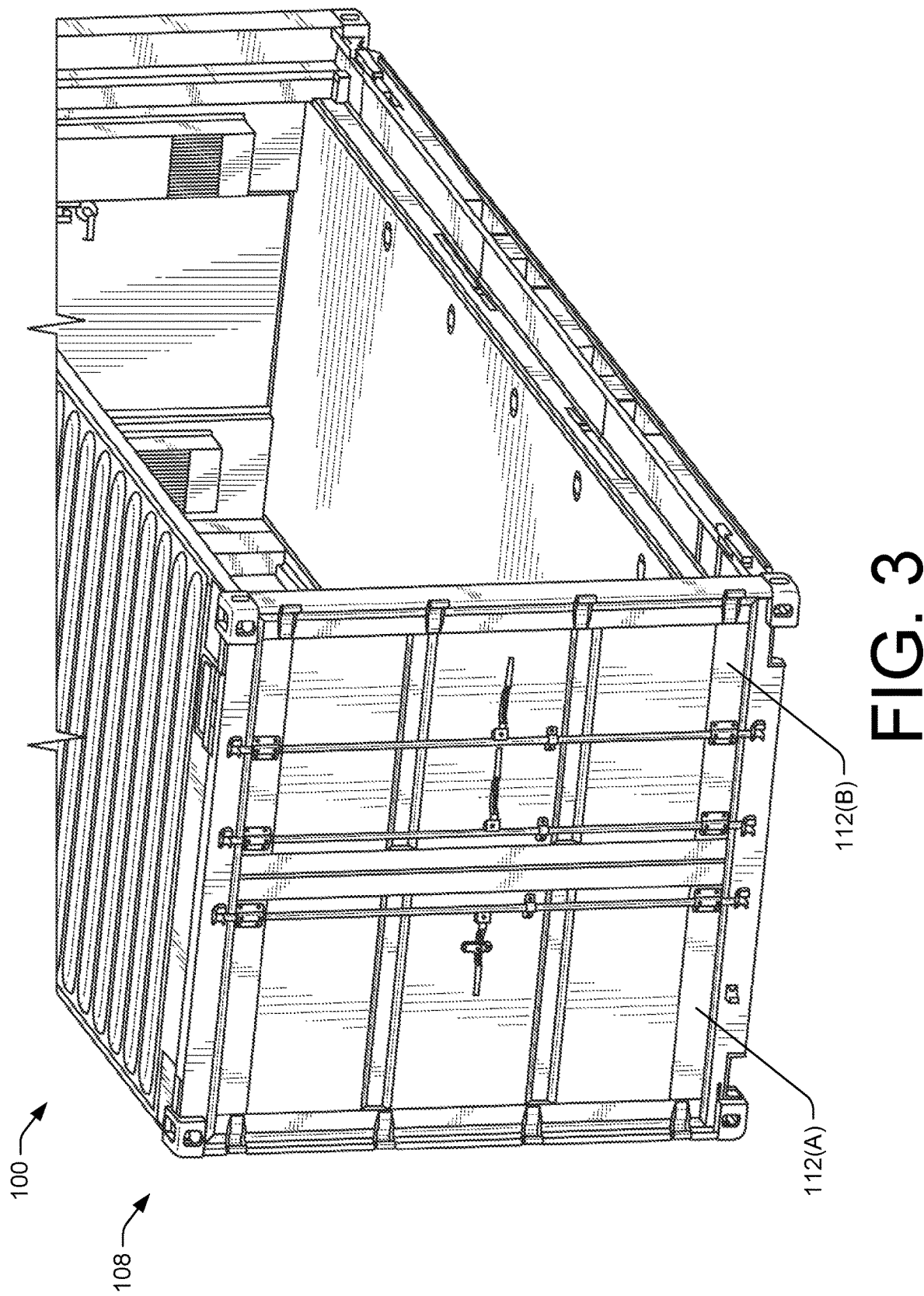
FIG. 3 is a perspective view of the exterior of the example expandable shelter of FIG. 1 showing the example appliance mount in a stowed state and the doors of the example expandable shelter in a closed position.

FIG. 3 illustrates the back end 108 of the expandable shelter 100, showing the louvered doors 112(A) and 112(B) closed. When the louvered doors 112(A) and 112(B) are closed the appliance mount 102 may be in the stowed state in preparation of the expandable shelter 100 being transported, for instance. To secure the insert 118 of the appliance mount 102 in the stowed state, the louvered doors 112(A) and 112(B) may abut or contact the insert 118 to advance or push the insert 118 into the interior 200 of the expandable shelter 100 (hereinafter, "second direction"). Alternatively, the insert 118 may be pushed in the second direction by one or more operators. In doing so, and while referencing FIG. 2, the cover 206 of the insert 118 may be displaced from the interior frame 202 and/or the interior surface 204 to extend into the interior 200 of the expandable shelter 100.

In the stowed state, the louvered doors 112(A) and 112(B) may be secured or locked. In some instances, the interaction between the louvered doors 112(A) and 112(B) and the insert 118 may prevent the insert 118 from backing out and moving in the first direction (i.e., away from the expandable shelter 100). When the louvered doors 112(A) and 112(B) are closed an interior surface of the louvered doors 112(A) and 112(B) may abut or contact an end of the insert 118 to prevent the insert 118 from advancing in the first direction. As such, when the louvered doors 112(A) and 112(B) are closed, the appliance mount 102 may be enclosed within the mechanical compartment 106. However, briefly returning to FIG. 1, when the louvered doors 112(A) and 112(B) are opened, the insert 118 may advance in the first direction.

Figure 4:
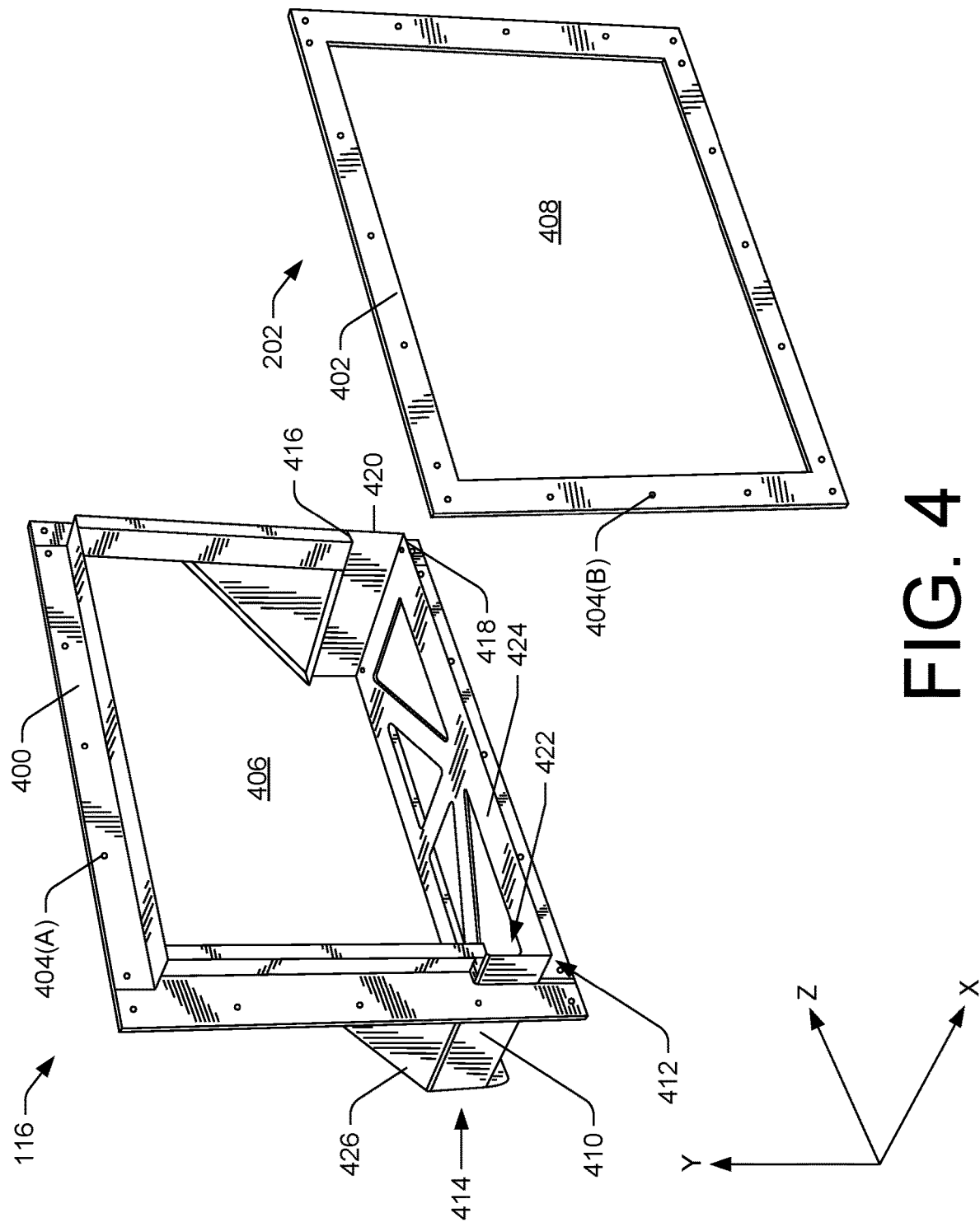
FIG. 4 is a perspective view of the example appliance mount of FIG. 1.

FIG. 4 illustrates a perspective view of the exterior frame 116 and the interior frame 202 of the appliance mount 102. As mentioned previously, the exterior frame 116 may mount or couple to the exterior surface 120 of the expandable shelter 100 and the interior frame 202 may mount or couple to the interior surface 204 of the expandable shelter 100. When the exterior frame 116 and the interior frame 202 are coupled to the expandable shelter 100, the wall of the expandable shelter 100 may be interposed between the exterior frame 116 and the interior frame 202.

The exterior frame 116 may have a flange 400 that couples the exterior frame 116 to the expandable shelter 100, such as the exterior surface 114 of the wall 113. Similarly, the interior frame 202 may have a flange 402 that may couple the interior frame 202 to the expandable shelter 100, such as the interior surface 204 (collectively, "flanges 400, 402"). The flange 400 may be disposed around all sides or surfaces of the exterior frame 116 while the flange 402 may be disposed around all sides or surfaces of the interior frame 202. For instance, the flange 400 on the exterior frame 116 may surround the opening 406 disposed through the exterior frame 116 while the flange 402 on the interior frame 202 may surround the opening 408 disposed through the interior frame 116. Alternatively, the flanges 400, 402 may occupy certain sides and/or surfaces of the exterior frame 116 and/or the interior frame 202, respectively. In addition, the flanges 400, 402 may extend outward from the exterior frame 116 and/or the interior frame 202 at any distance, lengths, and orientations, respectively.

Mounting holes 404(A) may be disposed through the exterior frame 116 and mounting holes 404(B) may be disposed through the interior frame 202 (collectively, "mounting holes 404"). In some instances, the mounting holes 404 may be disposed through the flange 400 of the exterior frame 116 and the flange 402 of the interior frame 202. In addition, the mounting holes 404 may be aligned or concentric to allow fasteners to be placed therethrough, through the wall of the expandable shelter 100, and couple the exterior frame 116 and the interior frame 202 together. In some instances, the exterior frame and the interior frame may be coupled to one another or the expandable shelter using screws, rivets, bolts/nuts, nails, or other like mechanical fasteners.

In some instances, the flanges 400, 402 may assist in aligning or centering the exterior frame 116 and/or the interior frame 202 through an opening in the expandable shelter 100. The opening in the expandable shelter 100 may correspond to where the appliance mount 102 is to be disposed. In addition, other flanges or lips may be included on the exterior frame 116 and/or the interior frame 202 that rest or are disposed within the opening of the expandable shelter 100 when the exterior frame 116 and/or the interior frame 202 is coupled to the expandable shelter 100.

The exterior frame 116 may have an opening 406. In some instances, the opening 406 may be disposed interior to the flange 400. Similarly, the interior frame 202 may also have an opening 408, which in some instances, may be disposed interior to the flange 402. When the exterior frame 116 and/or the interior frame 202 are coupled to the expandable shelter 100, the opening 406 of the exterior frame 116 may align with the opening 408 of the interior frame 202. In doing so, the appliance mount 102 may have an opening that extends between the exterior frame 116 and the interior frame 202 to allow the insert 118 to be disposed therethrough and through the wall of the expandable shelter 100.

The exterior frame 116 may include channels 410 extending between first ends 412 and second ends 414. The channels 410 may be defined by a top 416, a bottom 418, and a side 420. The channels 410 may also have an open side or face 422 oriented towards the opening 406 of the exterior frame 116, resembling a "U" shape. However, channels 410 may include any shape, such as being circular, planar, or any combination thereof.

In some instances, the opening 406 of the exterior frame 116 may be defined in part by the channels 410. That is, as shown in FIG. 4, the opening 406 of the exterior frame 116 may include a depth or width of the channels 410 that spans in between the side 420 and the open face 422. Therefore, the opening 406 of the exterior frame 116 may include at least a portion of the channels 410.

Discussed in more detail herein, the channels 410 may be sized to receive features of the insert 118 to operably transition the insert 118 between stowed and deployed states and allow the insert 118 to move in the first direction and the second direction. In some instances, the channels 410 may be disposed on opposing sides or surfaces of the exterior frame 116 and/or on opposite sides of the opening 406.

In some instances, the open side 422 of the channels 410 may not define at least part of the opening 406 of the exterior frame 116, but may instead be located exterior to the opening 406. In addition, in some instances, the channels 410 may not have the open side 422 but may instead have a closed side to enclose the channels 410 on all sides. Yet still, while FIG. 4 illustrates two channels, more or less channels 410 may be included.

Although FIG. 4 illustrates the channels 410 as being disposed or included within the exterior frame 116, in some instances, as mentioned previously, the channels 410 may be disposed on the interior frame 202 as well, in addition to, or instead of the channels 410 being disposed on the exterior frame 116. That is, the channels 410 may be integrated or otherwise coupled to the exterior frame 116 and/or the interior frame 202 in different manners. Therefore, the channels 410 may be split, divided, or allocated between the exterior frame 116 and/or the interior frame 202. For instance, the channels 410 may be disposed on sides, a top, or a bottom of the exterior frame 116. With reference to the Cartesian (X-Y-Z) coordinate system, the channels 410 may be disposed on sides of the exterior frame 116 along X-Y planes spaced apart in the Z-direction or on the top and/or the bottom of the exterior frame 116 along X-Z planes spaced apart in the Y-direction.

More generally, the channels 410 may be defined as or include any attachment members that interlock, engage, other are otherwise operably configured to engage the insert 118 and assist in transitioning the insert 118 in the first direction and the second direction. As such, the channels 410 may include slots, tabs, grooves, rollers, sockets, openings, apertures, pipes, etc. that engage with features of the insert 118. In some instances, the channels 410 may resemble "I" or "C" shaped channels, profiles, or footprints.

The exterior frame 116 may include a base 424 that extends between the channels 410 and that couples to the flange 400 of the exterior frame 116. The base 424 may extend between the first ends 412 and the second ends 414 of the channels 410 and may support the insert 118 of the appliance mount 102. In some instances, the base 424 may couple portions of the exterior frame 116 together, such as, for instance, the channels 410. The base 424 may also extend an entire length of the channels 410 between the first ends 412 and the second ends 414, or may extend less than the length of the channels 410. Portions of the base 424 may help or assist in supporting the insert 118 when engaged with the exterior frame 116.

Gussets 426 may be interposed between portions of the exterior frame 116, such as the flange 400, and portions of the channels 410 between the first ends 412 and the second ends 414. The gussets 426 may provide support to the channels 410 or carry a weight of the air-conditioner 104 and/or the insert 118.

Figure 5A:
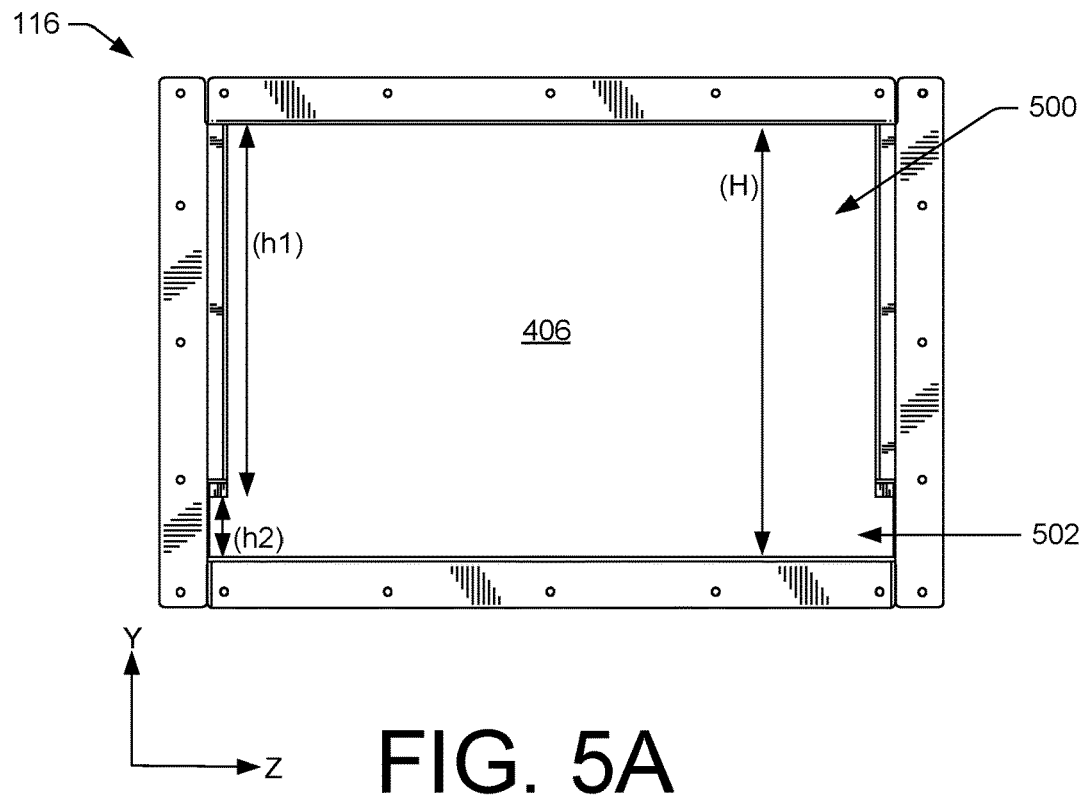
FIG. 5A is a front view of the example appliance mount of FIG. 4.
Figure 5B:
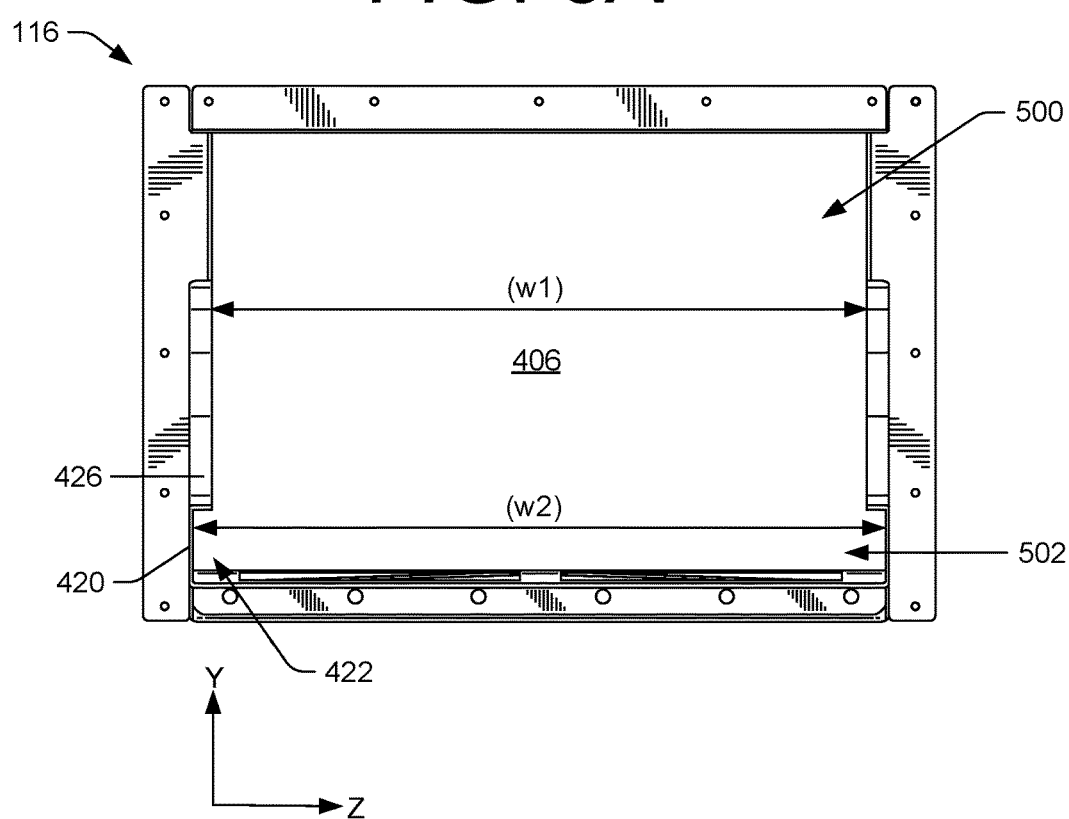
FIG. 5B is a back view of the example appliance mount of FIG. 4.

FIGS. 5A and 5B illustrate front and back views of the exterior frame 116 of FIG. 4, respectively. In some instances, the opening 406 of the exterior frame 116 may include multiple portions or may be defined by multiple portions. For instance, a first portion 500 may have a first width (w1) while a second portion 502 of the opening 406 may have a second width (w2). In some instances, the first width (w1) may be less than the second width (w2).

The first portion 500 may have a height (h1) while the second portion 502 may have a height (h2). Together, the height (h1) and the height (h2) may form a height (H) of the opening 406. In some instances, the opening 406 may therefor resemble an inverse "T".

In some instances, the second portion 502 of the opening 406 may be defined by in part by a depth or width of the channels 410. As referenced above, the width (w2) of the second portion 502 may include a depth or width of the channels 410 that spans in between the side 420 and the open face 422.

Figure 6:
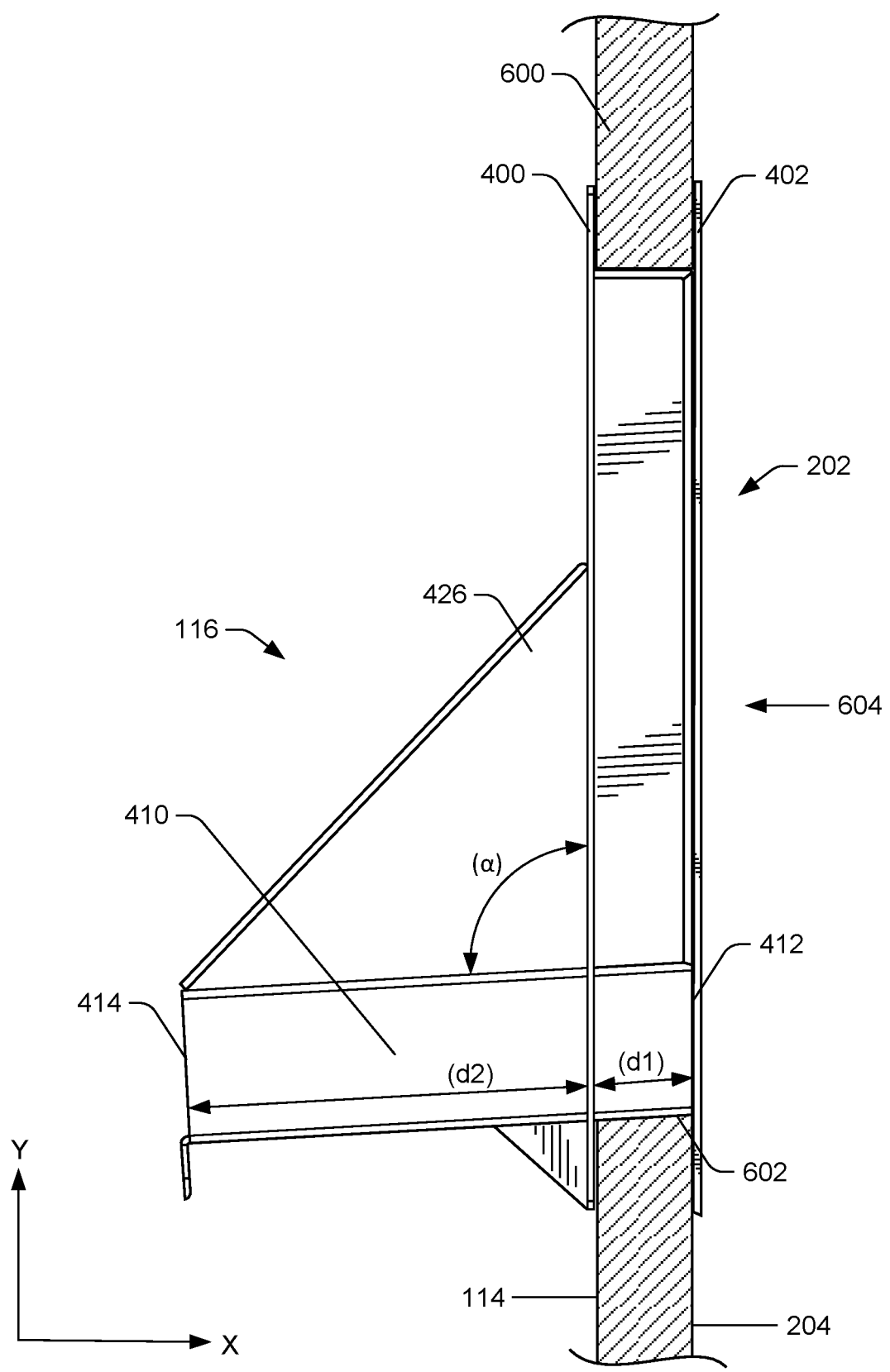
FIG. 6 is a side view of the example appliance mount of FIG. 4, showing the mount disposed through a cross-section of a wall of the expandable shelter of FIG. 1.

FIG. 5B also illustrates the gussets 426 of the exterior frame 116 extending between portions of the exterior frame 116, such as the flange 400, and the channels 410. FIG. 6 illustrates a cross-section of a wall 600 of the expandable shelter 100 with the exterior frame 116 of the appliance mount 102 disposed therethrough. As referenced above, the wall 600 may be interposed between the exterior surface 114 of the expandable shelter 100 and the interior surface 204 of the expandable shelter 100. In some instances, the exterior frame 116 may couple to the exterior surface 114 of the expandable shelter 100 while the interior frame 202 may couple to the interior surface 204 of the expandable shelter 100. In addition, FIG. 6 illustrates that the flanges 400, 402 may abut or couple to the exterior surface 114 and the interior surface 204, respectively. In doing so, in some instances, the flanges 400, 402 may be parallel to the exterior surface 114 and the interior surface 204, respectively.

In some instances, the exterior frame 116 and/or the interior frame 202 may be directly secured to the expandable shelter 100 such as being welded, for instance. Adhesives or sealants may also be used to create a water-tight bond or to assist in coupling the exterior frame 116 and/or the interior frame 202 to the expandable shelter 100. The exterior frame 116 and the interior frame 202 may be positioned or otherwise aligned around an opening 602 in the expandable shelter 100 through which the exterior frame 116 and/or the interior frame 202 are coupled. In addition, once coupled to the expandable shelter 100, the opening 406 of the exterior frame 116 and the opening 408 of the interior frame 202 may align to form an opening 604 through which the insert 118 may be engaged (pointing to the opening 604 created by the opening 406 and the opening 408). That is, the exterior frame 116 and the interior frame 202 may be placed on opposing sides of an opening in the expandable shelter 100 such that the wall 600 is interposed therebetween. To receive the insert 118, the opening 406 in the exterior frame 116 and the opening 408 in the interior frame 202 may be sized appropriately to allow the insert 118 and the air-conditioner 104, or other appliances, to fit therethrough.

In some instances, the flanges 400, 402 may orient or arrange the exterior frame 116 and/or the interior frame 202 on the expandable shelter 100 such that the opening 406 and the opening 408 align to form the opening 604.

As previously mentioned, the channels 410 may slope away from or extend transversely from the expandable shelter 100 at an angle ($\alpha$). To further explain the angle ($\alpha$), FIG. 6 includes a Cartesian (X-Y-Z) coordinate system, to which reference will now be made, in order to assist in the discussion of the orientation of the channels 410 relative to the exterior frame 116, the interior frame 202, and/or the expandable shelter 100. In some instances, the channels 410 may slope downward, along the X-direction, away from the interior 200 of the expandable shelter 100, from the first ends 412 of the channels 410 towards the second ends 414 of the channels 410. That is, from a first Y-Z plane on the interior surface 204 of the expandable shelter 100, towards a second Y-Z plane on the exterior surface 114 of the expandable shelter 100 spaced apart in the X-direction, the channels 410 may slope downward in the Y-direction.

In some instance, the angle ($\alpha$) may be an obtuse angle (i.e., greater than 90 degrees) relative to the flange 400. That is, the channels 410, between the first ends 412 and the second ends 414, along an X-Z plane tilted in the Y-direction, may be disposed at an obtuse angle relative to the second Y-Z plane. In some instances, the channels 410 may be disposed relative to the interior frame 202, such as being at an oblique angle relative to the interior frame 202. That is, the angle ($\alpha$) of the channels 410 may be oblique to a plane or surface defined by the interior frame 202.

Between the first ends 412 and the second ends 414, the channels 410 may intersect, couple, or traverse the exterior frame 116 and/or the interior frame 202. In some instances, the slope or angle of the channels 410 between the first ends 412 and the second ends 414 may be relative to the flanges 400, 402. For instance, FIG. 6 illustrates that the flange 400 of the exterior frame 116 is parallelly coupled to the exterior surface 114. Relative to the flange 400, between the first ends 412 and the second ends 414, the channels 410 may be angled away from the expandable shelter 100.

The first ends 412 of the channels 410 may be disposed from the flange 400 by a distance (d1). The distance (d1) may be substantially similar to a thickness of the wall 600 such that when the exterior frame 116 is coupled to the expandable shelter 100, the first ends 412 of the channels 410 are flush, substantially flush, or recessed from the interior surface 204. In doing so, in some instances, when the interior frame 202 is coupled to the exterior frame 116 and/or the interior surface 204, the exterior frame 116 and/or the interior frame 202 116 may be secured flush with the wall 600.

FIG. 6 also illustrates other portions, such as other flanges, rims, borders, or lips of the exterior frame 116 disposed within the opening 602 of the wall 600. These other portions may assist in squaring, aligning, or resting the exterior frame 116 within the opening 602 of the wall 600. Similar to the flange 400, these other portions of the exterior frame 116 may extend from the exterior frame 116 or the flange 400 at the distance (d1) equal to or substantially equal to a thickness of the wall 600. In some examples, the recession or flushness with the interior frame 202 may properly secure to the expandable shelter 100. In other examples, the interior frame 202 may be secured to the expandable shelter 100 without recesses and/or with an uneven/discontinuous interface.

The second ends 414 of the channels 410 may extend from the flange 400 by a distance (d2). In some instances, the distance (d2) may be greater than the distance (d1). The second ends 414 of the channels 410 may therefore be disposed exterior to the expandable shelter 100 when the exterior frame 116 is coupled to the expandable shelter 100.

To support or reinforce the channels 410, the gussets 426 may be interposed between the flange 400 and the channels 410. However, while FIG. 6 illustrates the gussets 426 extending the distance (d2) towards the second ends 414, the gussets 426, in some instances, may extend at other distances.

Figure 7:
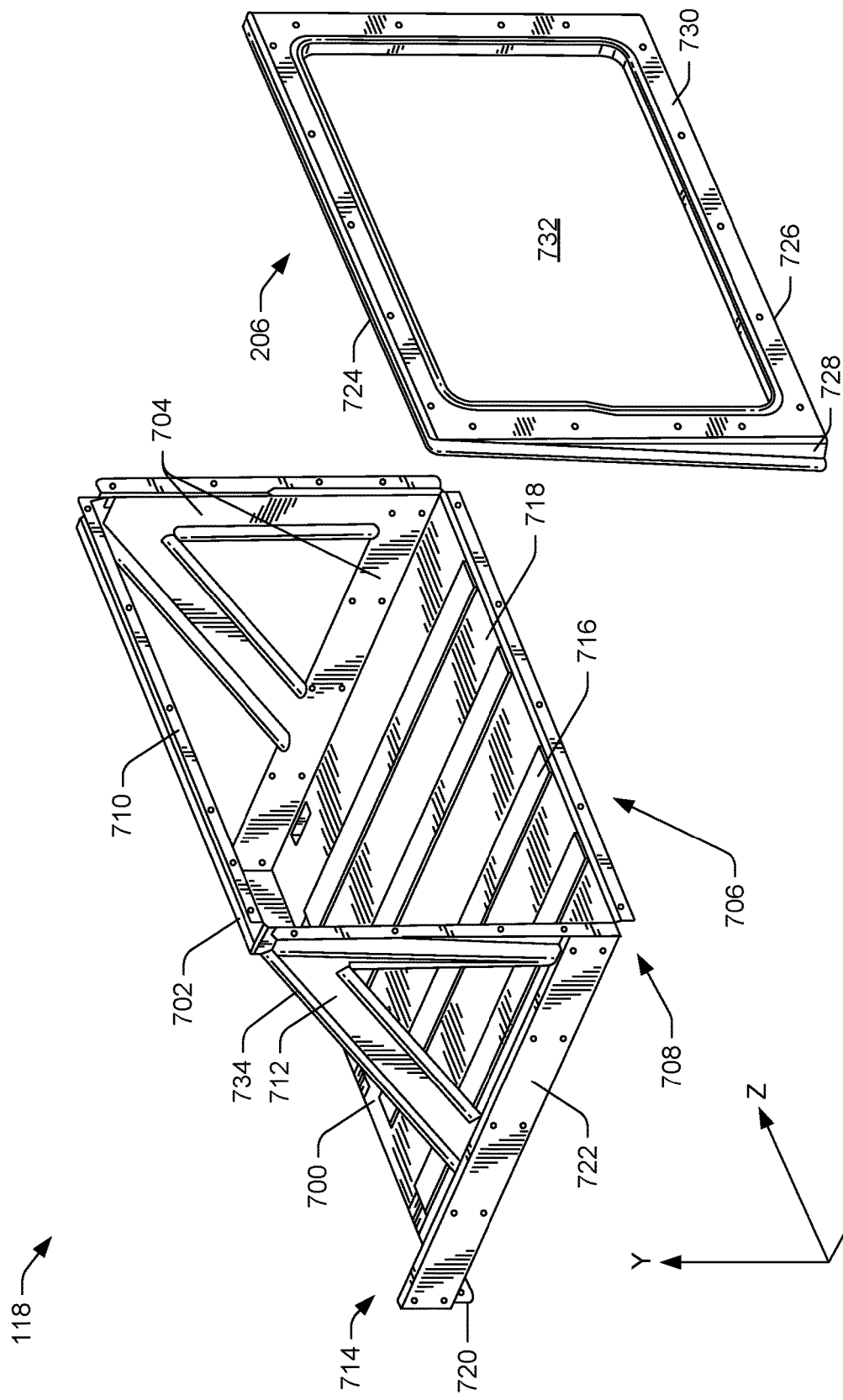
FIG. 7 is a perspective view of an insert of the example appliance mount of FIG. 1.

FIG. 7 illustrates a perspective exploded view of the insert 118 of the appliance mount 102. The insert 118 may be configured to be insertable into or through the exterior frame 116 and/or the interior frame 202. For instance, the insert 118 may be sized to be insertable through the opening 604.

The insert 118 may include a base 700, a top 702, and sides 704 interposed between the base 700 and the top 702. The insert 118 may also include an opening 706 disposed at a first end 708 of the insert 118 in between the base 700, the top 702, and the sides 704. A flange 710 may surround the opening 706 at the first end 708. The opening 706 may be sized to receive the air-conditioner 104 such that the air-conditioner 104 may be disposed through the opening 706 and rest within the insert 118. Accordingly, a length of the base 700 and a width of the base 700 may be complimentary to receive a footprint of the air-conditioner 104. In addition, as referenced above, the air-conditioner 104 may be sized to fit with the height (H) of the opening 406. Once inserted, the air-conditioner 104 may reside within or interior to the sides 704 of the insert 118.

The sides 704 may extend at any length or direction towards the top 702. In some instances, vertical supports 712 may extend from the sides 704 and couple to the top 702 and/or other portions of the sides 704. The vertical supports 712 may provide support to the insert 118 to assist in carrying the weight of the air-conditioner 104. Furthermore, the sides 704 may extend at any length between the first end 708 of the insert 118 and a second end 714 of the insert 118 opposite the first end 708.

The base 700 may include strips 716 that span a length or less than a length of the insert 118, between the first end 708 and the second end 714. Interposed between adjacent strips 716 may be gaps 718. In some instances, the strips 716 may separate a bottom surface of the air-conditioner 104 from the base 700 such that condensation from the air-conditioner 104 may traverse the gaps 718. Additionally, or alternatively, the strips 716 may protect the air-conditioner 104 from scratching the base 700. The strips 716 may be manufactured from metal, polymers, rubbers, composites, or any combination thereof. The strips 716 may have a higher coefficient of friction as compared to the base 700, and may be manufactured form materials such as Teflon, polytetrafluoroethylene (PFTE), high-density polyethylene (HDPE), etc. In some instances, the strips 716 may have a lower coefficient of friction as compared to the base 700, and may be manufactured form materials such as rubber, composites, wood, etc.

At the second end 714 of the insert 118 a lip 720 may be included. Discussed in more detail herein, the lip 720 may be configured to receive additional features of the insert 118 once the insert 118 is engaged with the exterior frame 116 and/or the interior frame 202.

Slides 722 or other members may be coupled to the base 700 and/or the sides 704. The slides 722 may extend between the first end 708 and the second end 714 of the insert 118 and may be oriented at any angle relative to the base 700, the top 702, the sides 704, the first end 708, and/or the second end 714. When the insert 118 is inserted into the exterior frame 116, the slides 722 may engage with a complimentary channel of the channels 410. Accordingly, the slides 722 and/or the channels 410 may be sized appropriately or corresponding to one another.

Returning briefly to FIGS. 5A and 5B and the opening 406 of the exterior frame 116, in some instances, the width of the base 700 of the insert 118 may be sized to fit within the first portion 500 of the opening 406. In addition, the sides 704 and the vertical supports 712 may be sized to fit within the first portion 500 of the opening 406. However, a width or thickness of the slides 722, when coupled to the base 700, may not be sized to fit within the first portion 500 of the opening 406 given that the combined width of the slides 722 and the base 702 may be greater than the width (w1) of the first portion 500. However, the width (w2) of the second portion 502 may be complimentary to receive the combined width of the slides 722 and the base 700. As such, the insert 118 may engage with the opening 406 of the exterior frame 116 such that the slides 722 are engaged or disposed within the channels 410.

Furthermore, because of the relative size of the width (w1) and the width (w2), when inserted into the exterior frame 116, the insert 118 may be prevented from disengaging with the channels 410 in directions other than the first direction and the second direction. That is, in some instances, when the slides 722 are engaged with the channels 410, the insert 118 may permitted to move only in the first direction (e.g., away from the expandable shelter 100) and in the second direction (e.g., towards the expandable shelter 100).

As referenced above with regards to the channels 410, while FIG. 7 depicts a particular configuration of the slides 722, the slides 722 may be embodied as different structures or disposed on the insert 118 at different locations and/or orientations. For instance, rather than being square or planar, the slides 722 may be circular, may include rollers, slides, struts, other like complimentary features to engage with the channels 410. In addition, as mentioned above, the channels 410 may include other like engagement or attachment mechanisms to be complimentary to the slides 722, vice versa.

The insert 118 may include the cover 206. In some instances, the cover 206 may couple to the flange 710 of the insert 118 and couple thereto via mounting holes disposed through the flange 710. For the purpose of illustrating components of the insert 118, the cover 206 is shown as being separated from the base 700.

The cover 206 may include a top 724, a bottom 726, and sidewalls 728 interposed between the top 724 and the bottom 726 of the cover 206. Collectively, the top 724, the bottom 726, and the sidewalls 728 may define a perimeter of the cover 206. The cover 206 may also include a face 730 through which an opening 732 extends.

In some instances, the sidewalls 728 of the cover 206 may include a taper that enlarges from the top 724 towards the bottom 726 of the cover 206. However, in some instances, the tapers may enlarge from the bottom 726 towards the top 724 of the cover 206. That is, the sidewalls 728 may be tapered such that the sidewalls 728 are larger proximate to the bottom 726 of the cover 206 than proximate to the top 724 of the cover 206.

In some instances, the taper may correspond to the angle (u) at which the channels 410 slope away or extend transversely from exterior frame 116, the interior frame 202, the flange 400, and/or the expandable shelter 100. Discussed in more detail later, the similarity between the taper on the sidewalls 728 and the angle (u) at which the channels 410 are disposed through the exterior frame 116 and/or the interior frame 202 may allow the insert 118 to abut interior surface 204 of the expandable shelter 100 and/or the interior frame 202 when the appliance mount 102 is in the deployed state. That is, the perimeter of the cover 206 may abut interior surface 204 of the expandable shelter 100 and/or the interior frame 202 when the insert 118 is inserted into the exterior frame 116 and extended in the first direction.

Furthermore, foam, seals, or other padding 734 may be adhered, coupled, or placed on portions of the insert 118. In some instances, the padding 734 may abut or come into contact with portions of the exterior frame 116 to provide a water-tight barrier or to thermally insulate and/or seal the interior 200 of the expandable shelter 100.

Figure 8:
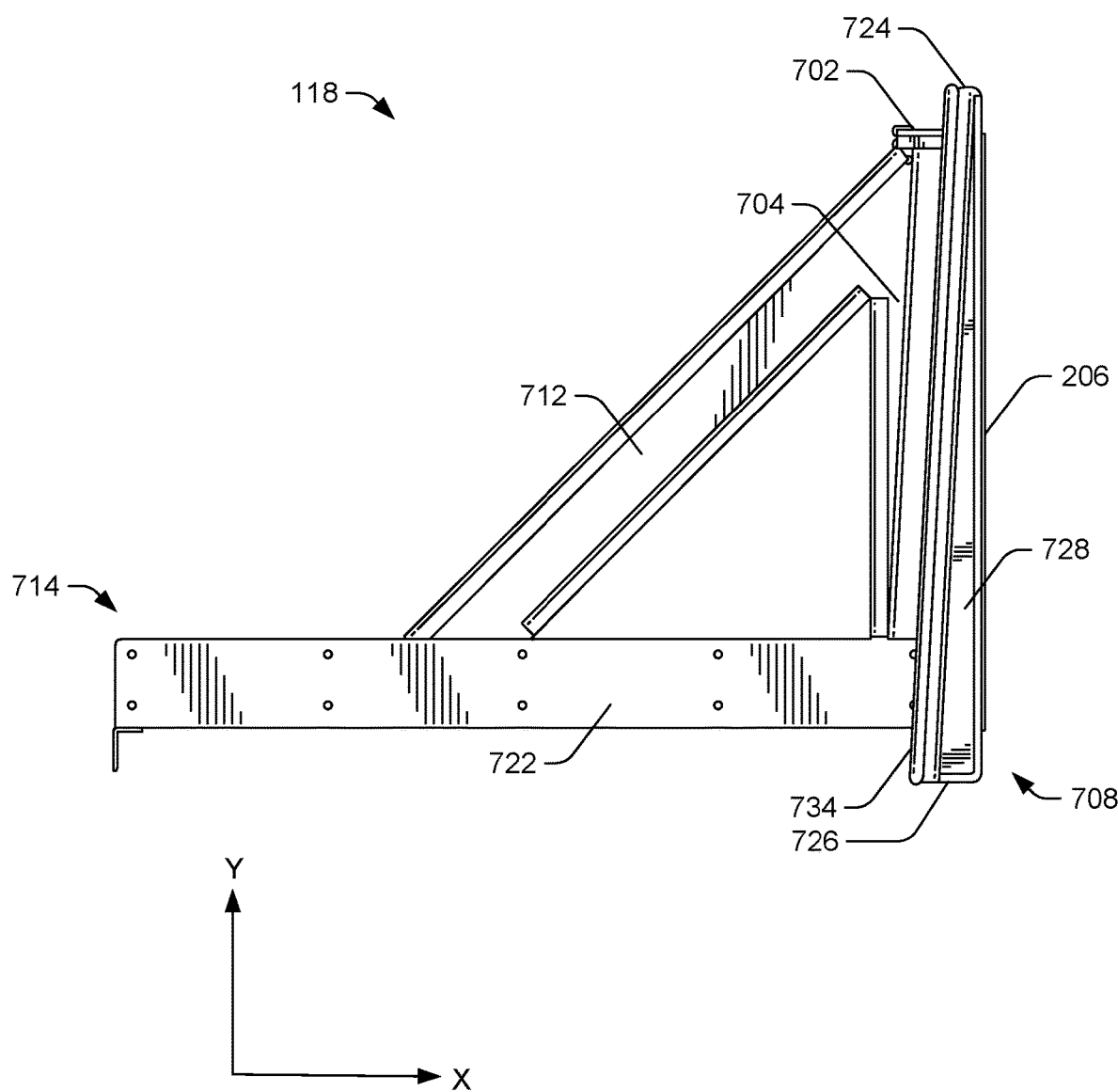
FIG. 8 is a side view of the insert of FIG. 7.

FIG. 8 illustrates a side view of the insert 118. The sides 704 may extend a length of the base 700 between the first end 708 and the second end 714 and may couple to the top 702 of the insert 118. The vertical supports 712 may couple to portions of the top 702 and/or the sides 704.

Compared to FIG. 7, FIG. 8 illustrates the cover 206 coupled to the insert 118. In some instances, the cover 206 may couple to portions of the base 700, the top 702, the sides 704, the flange 710, and/or the slides 722. Moreover, in some instances, the base 700, the top 702, the sides 704, the flange 710, and/or the slides 722 may be coupled interior to the top 724 of the cover 206, the bottom 726 of the cover 206, and/or the sidewalls 728 of the cover 206. In doing so, the base 700, the top 702, the sides 704, the flange 710, and/or the slides 722 may be disposed interior to the perimeter of the cover 206. Accordingly, when the insert 118 is inserted or engaged with the exterior frame 116 and/or the interior frame 202 in the deployed position, the perimeter of the cover 206 may but the interior surface 204 of the expandable shelter 100 and/or the interior frame 202. That is, no disturbances may be interposed between the perimeter of the cover 206 and the interior surface 204 of the expandable shelter 100 and/or the interior frame 202. In addition, to thermally insulate or water-proof the interior 200 of the expandable shelter 100, a seal 734 may be disposed around the perimeter of the cover 206.

To prevent the air-conditioner 104 from slipping out of the insert 118 towards the interior 200, the opening 732 in the cover 206 may be sized smaller than the opening 706 in the insert 118. For instance, the opening 732 may have a width that is smaller than a width of the base 700 and a height that is smaller than a height of the cover 206. Therefore, in some instances, the cover 206 may couple to the insert 118 after the air-conditioner 104 is placed within the insert 118. The opening 732 may also allow for controls of the air conditioner 104 to be accessed within the interior 200 of the expandable shelter 100.

Figure 9A:
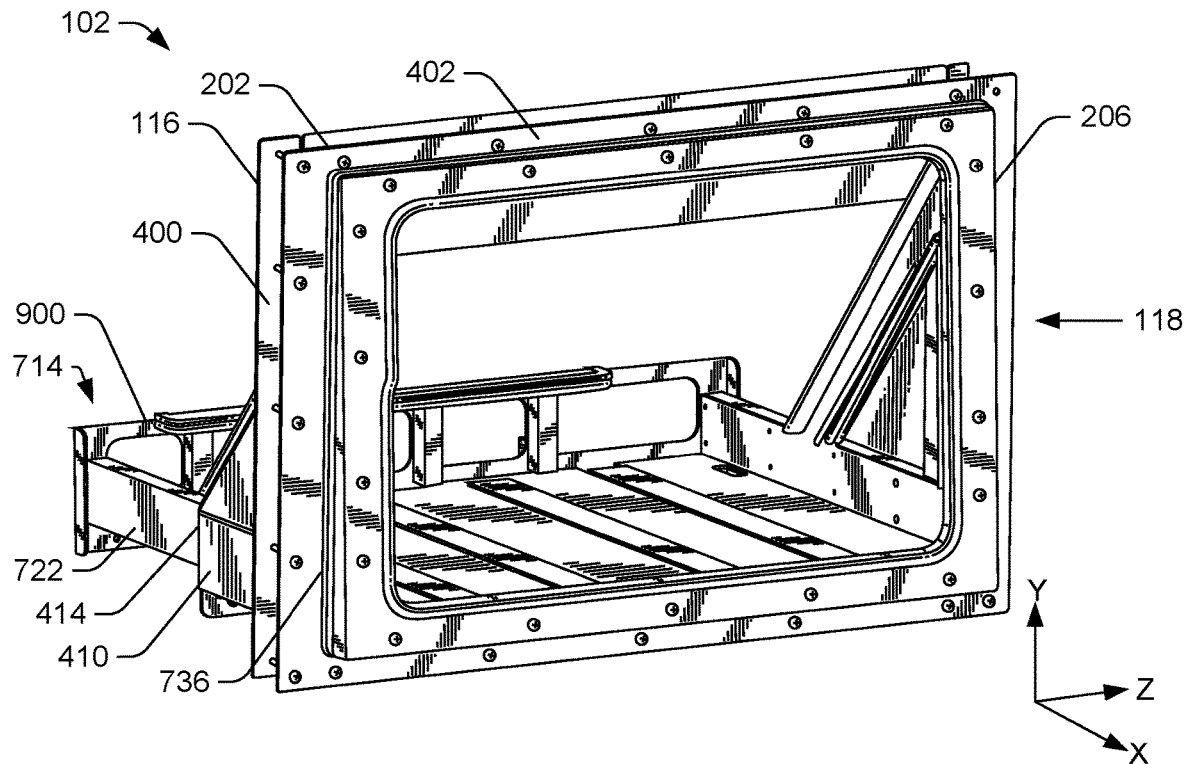
FIG. 9A is a front perspective view showing, in the deployed state, the example appliance mount of FIG. 4 engaged with the insert of FIG. 7.
Figure 9B:
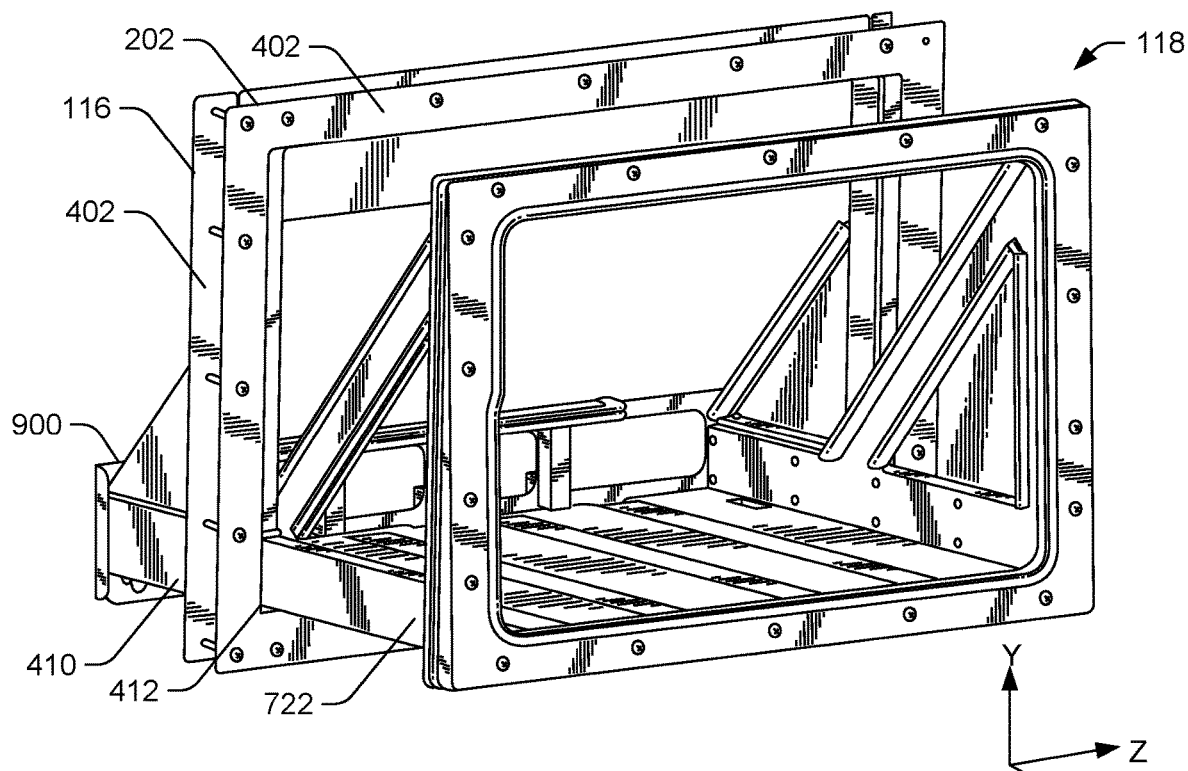
FIG. 9B is a front perspective view showing, in the stowed state, the example appliance mount of FIG. 4 engaged with the insert of FIG. 7.

In FIGS. 9A and 9B illustrate the engagement between the exterior frame 116, the interior frame 202, and the insert 118. FIG. 9A illustrates the appliance mount 102 in the deployed state while FIG. 9B illustrates the appliance mount 102 in the stowed state. As referenced above, in the deployed state, the appliance mount 102 may expand a footprint of the expandable shelter 100, while in the stowed state, the appliance mount 102 may be prepared in anticipation of transporting the expandable shelter 100 and extend farther into the interior 200.

In some instances, the exterior frame 116 may be mounted to the expandable shelter 100 such that the wall 600 of the expandable shelter 100 is interposed between the exterior frame 116 and the interior frame 202, between the flange 400 of the exterior frame 116 and the flange 402 of the interior frame 202. In both the deployed and stowed states, the slides 722 of the insert 118 may engage with the channels 410 of the exterior frame 116.

To engage the insert 118 with the exterior frame 116, the opening 604 in the exterior frame 116 may be sized to receive the insert 118. The base 700 and the slides 722 of the insert 118 may be sized to be disposed within the second portion 502 of the opening 406 of the exterior frame 116. The combined width of the base 700 and a width of the slides 722 may therefore be sized smaller than the width (w2). Furthermore, the base 700 and the vertical supports 712 may be sized to be disposed within the first portion 500 of the opening 406 of the exterior frame 116. Accordingly, the interaction between the slides 722 and the channels 410 may allow the insert 118 to be pushed, pulled, or maneuvered between the deployed and stowed states and in the first direction and the second direction, via the channels 410 interacting with the slides 722.

In the deployed state, FIG. 9A depicts the cover 206 abutting the interior frame 202 via the seal 736 disposed around the perimeter of the cover 206. In the deployed state, the insert 118 may be prohibited from extending farther in the first direction via the interaction between the cover 206 and the interior frame 202. As such, the insert 118 may be prevented from disengaging with the exterior frame 116 when extended to the deployed state. In some instances, in the deployed state, the sidewalls 728 may be substantially parallel to and contact the interior frame 202

In instances where the interior frame 202 is excluded, however, the cover 206 may alternatively abut the interior surface 204 of the expandable shelter 100.

On the exterior of the expandable shelter 100, when the insert 118 is extended in the first direction, the second end 714 of the insert 118 may be separated from the second ends 414 of the channels 410. This separation may come by way of the louvered doors 112(A) and 112(B) being opened to permit the insert 118 to extend in the deployed state (see FIG. 1).

In the stowed state, the cover 206 may be spaced apart or separated from the interior surface 204 of the expandable shelter 100, the interior frame 202, and or the first ends 412 of the channels 410. As such, the insert 118 and the air-conditioner 104 may be disposed at a greater distance within the interior 200 of the expandable shelter 100 compared to the deployed state.

To prevent the insert 118 from advancing completely into the interior 200 of the expandable shelter 100 in the first direction, a back plate 900 may be disposed on the second end 714 of the insert 118. In some instances, the back plate 900 may couple to the insert 118 via the lip 720 and/or other portions of the insert 118.

The back plate 900 may have a width sized larger than the width (w2) of the second portion 502 of the opening 406. Additionally or alternatively, the back plate 900 may have a height greater than the height (h2) of the second portion 502. Accordingly, the insert 118 may be prevented from disengaging with the exterior frame 116 through an interaction between the back plate 900 and the second ends 414 of the channels 410. However, to permit the insert 118 to be inserted into the opening 106 of the exterior frame 116, the back plate 900 may be coupled to the insert 118 after the insert 118 is inserted into the exterior frame 116 and when the second end 714 of the insert 118 extend past the second ends 414 of the channels 410.

Figure 10A:
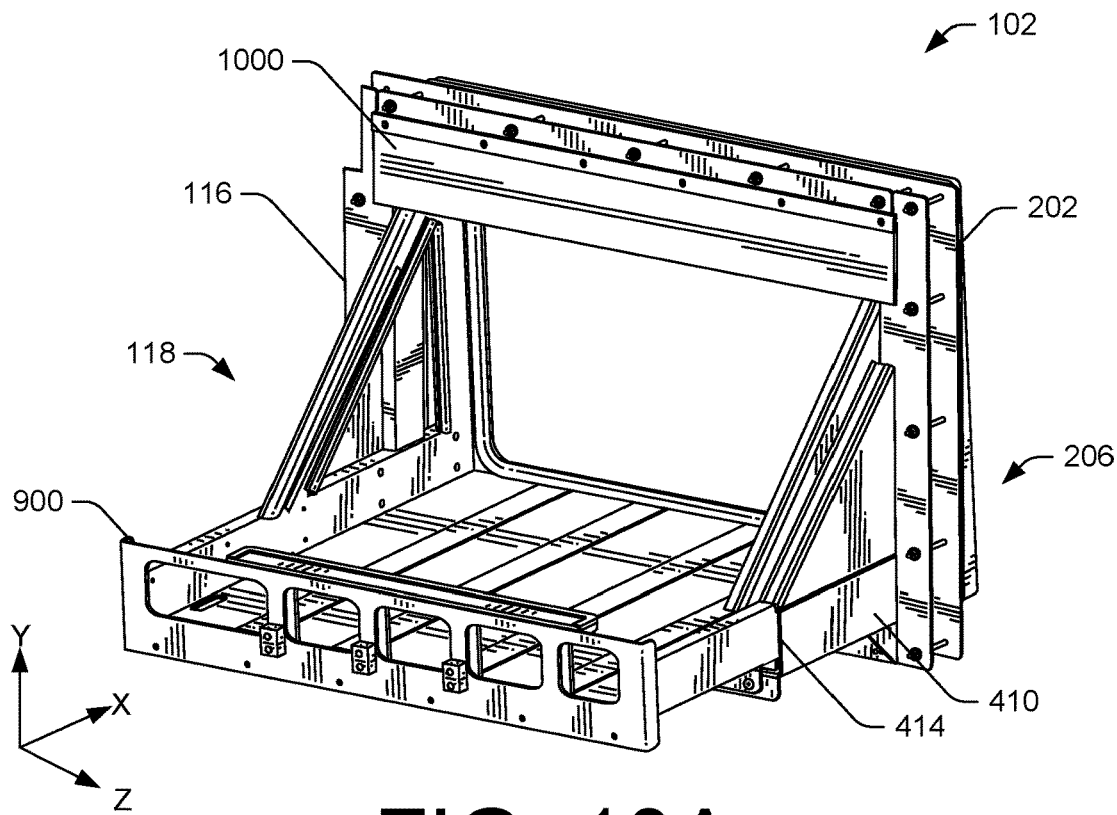
FIG. 10A is a back perspective view showing, in the deployed state, the example appliance mount of FIG. 4 engaged with the insert of FIG. 7.
Figure 10B:
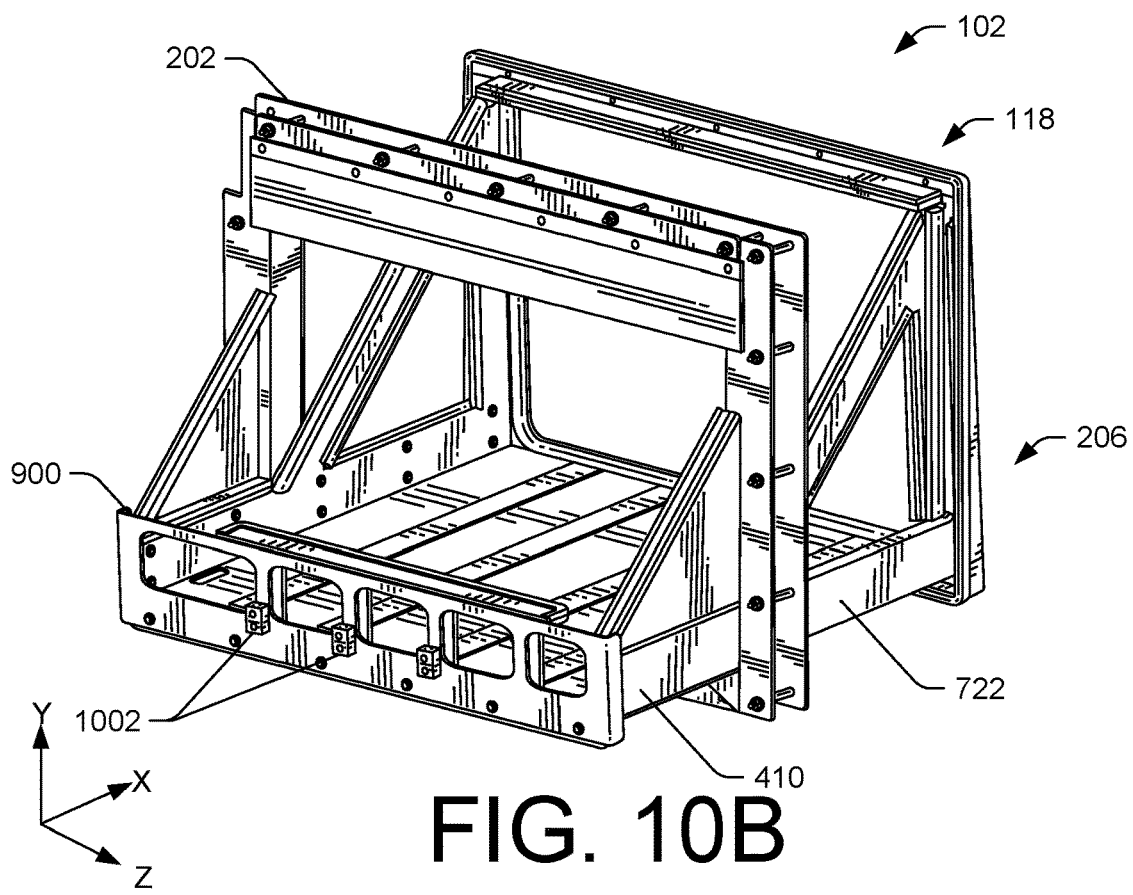
FIG. 10B is a back perspective view showing, in the stowed state, the example appliance mount of FIG. 4 engaged with the insert of FIG. 7.

In some instances, to assist in in the movement of the insert 118 between the stowed and deployed states, the channels 410 and/or the slides 722 may include bushings, bearings, rollers, or lubricants. Pneumatics or other electronics may also be used to assist in transitioning the appliance mount 102 between stowed and deployed states FIGS. 10A and 10B illustrate perspective views of the appliance mount 102 in the deployed state and the stowed state, respectively. In FIG. 10A, the insert 118 is shown as being extended completely in the first direction such that the perimeter of the cover 206 abuts the interior frame 202. In the deployed state, FIG. 10A illustrates the back plate 900 of the insert 118 separated from the second ends 414 of the channels 410.

In some instances, a skirt 1000 may couple to the exterior frame 116 and drape or hang towards the opening 406. The skirt 1000 may interact with an upper surface of the air-conditioner 104 and prevent rain or other moisture from permeating the expandable shelter 100. The skirt 100 therefore may act as a flap in the sense that it flexes or repositions when the insert 118 is moved in the first direction and the second direction. That is, the skirt 1000 may bend or deflect against a top surface of the air-conditioner 104 when the air-conditioner 104 is inserted into the insert 118. The flex in the skirt 1000, which may be oriented away from or slant way from the interior 200 of the expandable shelter 100, may help repel water and/or prevent water from reaching the interior 200 of the expandable shelter 100.

In the stowed state, FIG. 10B illustrates that the back plate 900 abuts the second ends 414 of the channels 410 to prevent the insert 118 from advancing further in the second direction (i.e., towards the interior 200 of the expandable shelter 100). As discussed in FIG. 3, in the stowed state, the insert 118 may be prevented from also advancing in the first direction (i.e., away from the interior 200 of the expandable shelter 100), through the back plate 900 abutting the louvered doors 112(A) and 112(B). To cushion this interaction between the back plate 900 and the louvered doors 112(A) and 112(B), bumpers 1002 may be disposed on the back plate 900 to face the louvered doors 112(A) and 112(B). The slides 722 may be disposed within the interior 200 in the stowed state, with portions of the slides 722 extending past the first ends 712 of the channels 410.

In some instances, portions of the back plate 900 may abut or couple to the air-conditioner 104 to position, cushion, and/or secure the air-conditioner 104 within the insert. Particularly, given the different sizes of air-conditioners or other appliances, extrusions may extend from the back plate 900, for instance, inward at distances to abut and/or couple to the air-conditioner 104. Similarly, extrusions or other bumpers may extend from the sides 704 and/or the vertical supports 712. The protrusions on the back plate 900 and/or the insert 118 may be on-the-fly adjustable to accommodate differently sized air-conditioners or may be of a definitive length.

Furthermore, FIGS. 10A and 10B illustrate that padding or seals may be disposed on the exterior frame 116 and/or the insert 118 to thermally insulate the expandable shelter 100 around the opening 602, to prevent damage to the air-conditioner 104 or to seal the interior 200. In some instances, the padding or seals may prevent light from escaping the interior 200 of the expandable shelter 100 or may prevent dirt or other debris from entering the interior 200.

Figure 11A:
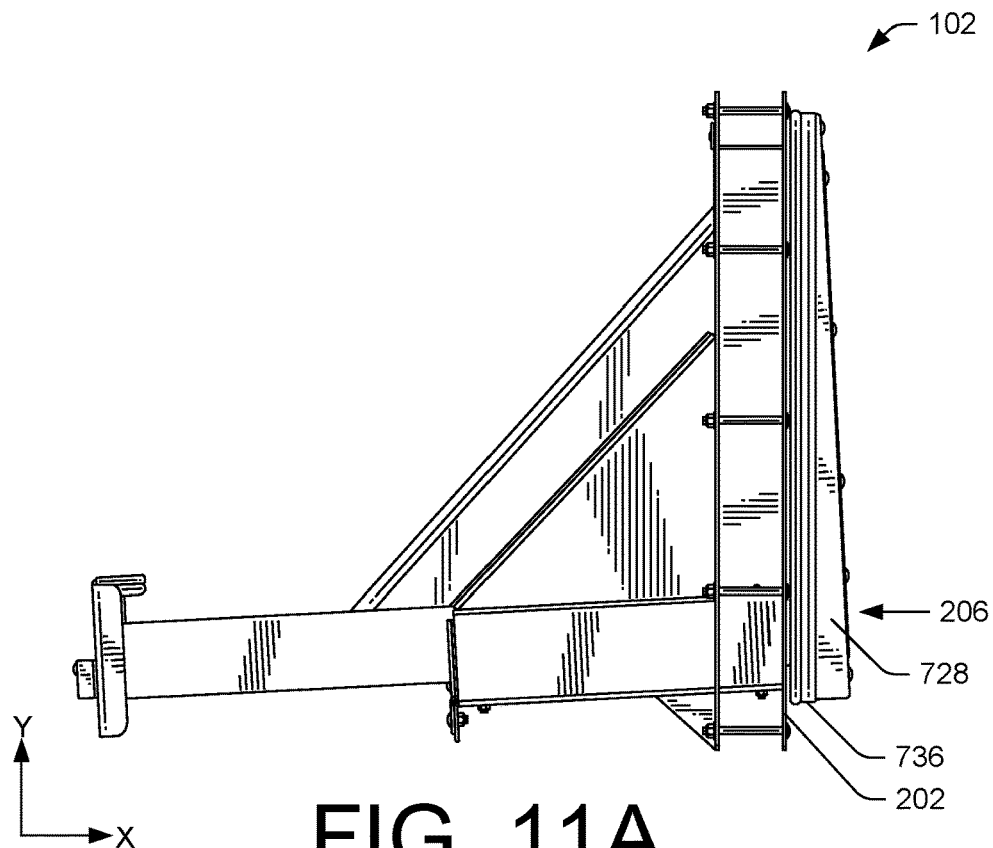
FIG. 11A is a side view showing, in the deployed state, the example appliance mount of FIG. 4 engaged with the insert of FIG. 7.
Figure 11B:
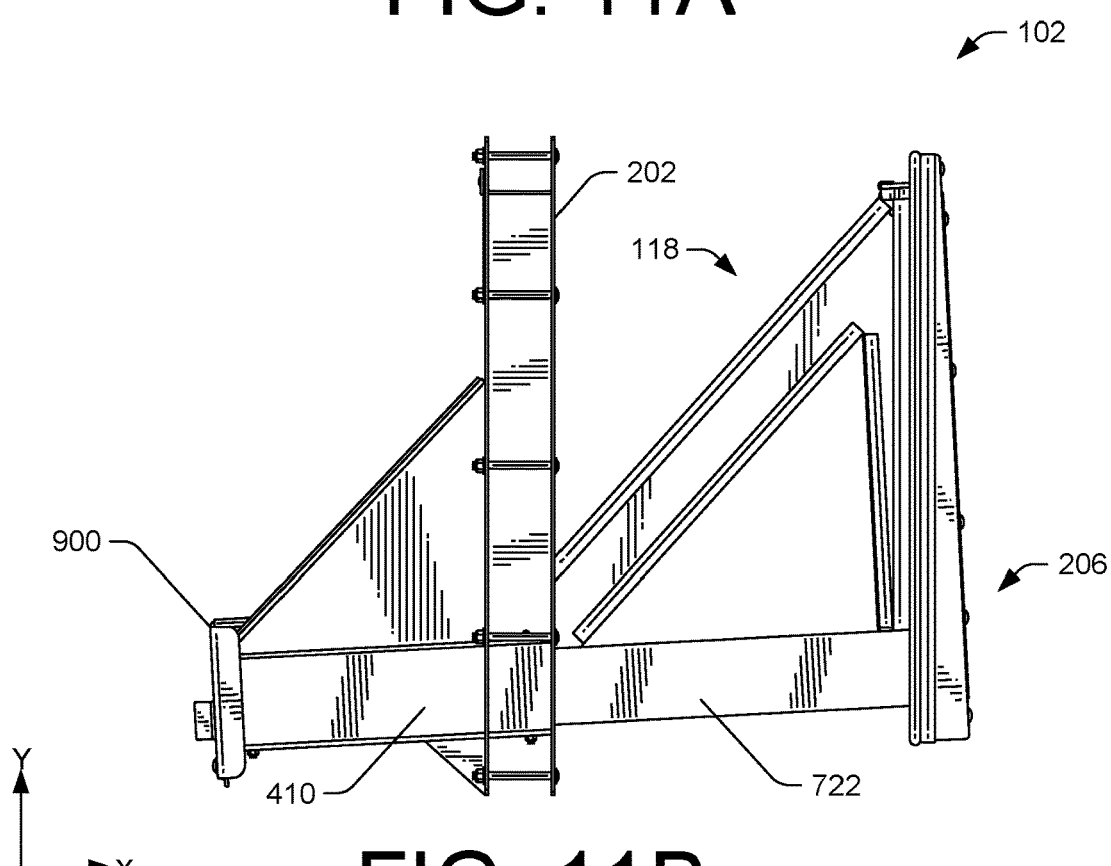
FIG. 11B is a side view showing, in the stowed state, the example appliance mount of FIG. 4 engaged with the insert of FIG. 7.

FIGS. 11A and 11B illustrate side views of the appliance mount 102 in the deployed and stowed states, respectively. Shown in both FIGS. 11A and 11B, the channels 410 may be at an oblique angle relative to the interior frame 202. In addition, the sidewalls 728 may be tapered such that the sidewalls 728 are larger proximate to the bottom 726 of the cover 206 than proximate to the top 724 of the cover 206.

Beginning with FIG. 11A, in the deployed state, the cover 206 may abut or couple to the interior frame 202. The seal 736 disposed around the perimeter (i.e., the top 724, the bottom 726, and the sidewalls 728) of the cover 206 may contact the interior frame 202 to thermally insulate the interior 200 or seal the interior 200. In the deployed state, given that the sidewalls 728 of the cover 206 are tapered, the cover 206 may abut the interior frame 202. In some instances, the sidewalls 728 may be substantially parallel to and contact the interior frame 202.

In the stowed state, when the insert 118 is advanced all the way in the second direction, the back plate 900 may abut the second ends 414 of the channels 410 and/or other portions of the exterior frame 116. As such, in the stowed state, the cover 206 may be disposed away from or separated from the interior frame 202. The slides 722 may be exposed passed the first ends 712 of the channels 410.

Figure 12:
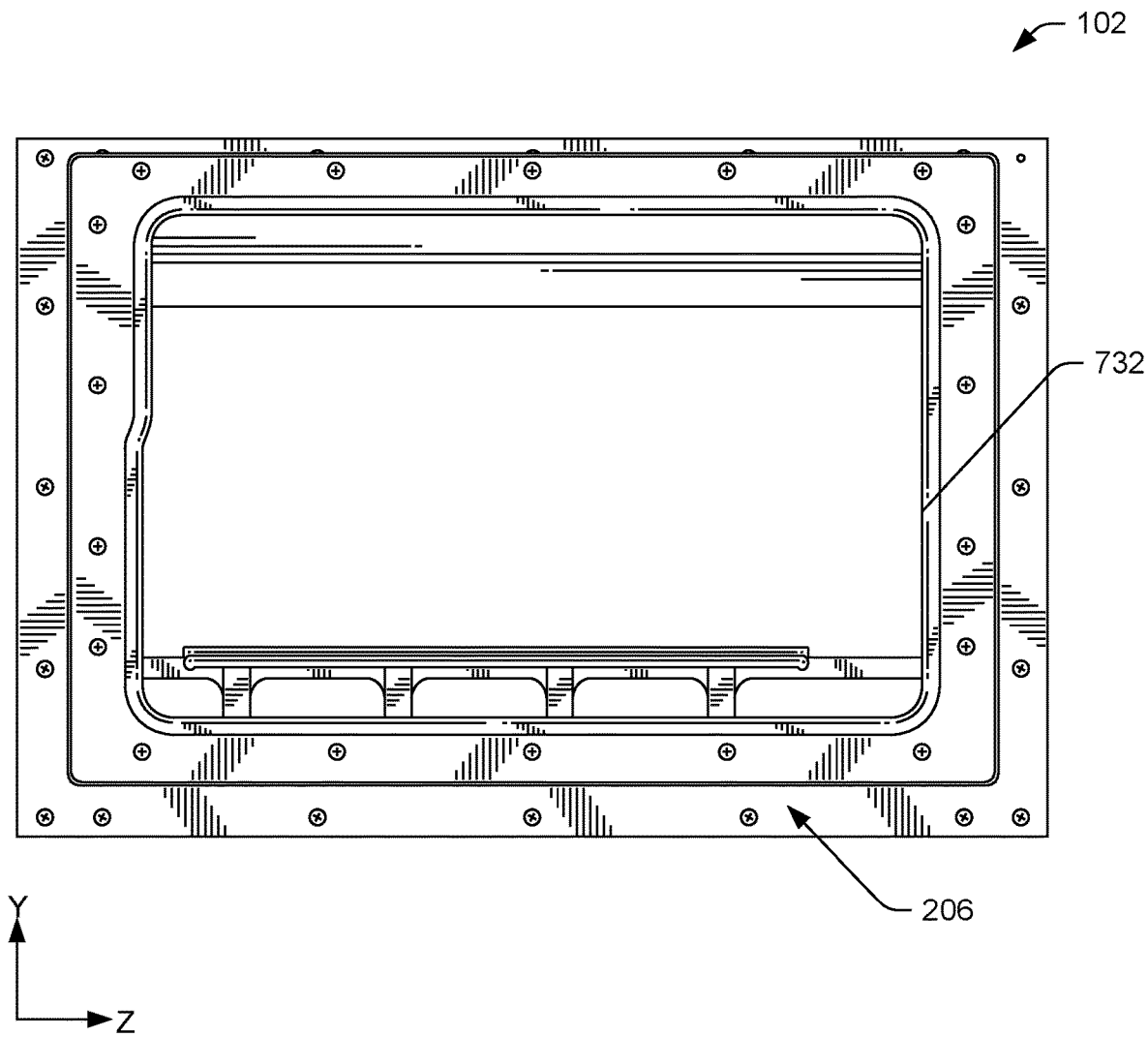
FIG. 12 is a front view showing the example appliance mount of FIG. 4 engaged with the insert of FIG. 7.

FIG. 12 illustrates a front view of the appliance mount 102. In some instances, the cover 206 of the insert 118 may be larger than the opening 406 in the exterior frame 116. With this, the insert 118 may be prevented from disengaging with the exterior frame 116 when the insert 118 is in the deployed state. In addition, the opening 732 in the cover 206 may be smaller than a width and height of the air-conditioner 104 to prevent air-conditioner 104 from sliding out of the insert 118 and into the interior 200 of the expandable shelter 100.

CONCLUSION

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A shelter comprising:
an air handling unit;
an enclosure including a wall defining a barrier between an interior of the enclosure and an exterior of the enclosure, the wall having an opening; and
an assembly including:
a mount disposed through the opening of the wall, the mount having:
an interior frame coupled to an interior surface of the wall;
an exterior frame coupled to an exterior surface of the wall, wherein the wall is interposed between the interior frame and the exterior frame;
an opening extending between the interior frame and the exterior frame; and
at least two channels coupled to at least one of the interior frame or the exterior frame;
an insert configured to transition between a stowed position and a deployed position, the insert having:
a cover including a front, a top, a bottom, sidewalls extending between the top and the bottom, and an opening to permit access to the air handling unit;

at least two slides sized to fit within the at least two channels, the at least two slides being disposed interior to the sidewalls; and a base plate extending between the at least two slides, wherein the base plate is sized to receive a footprint of the air handling unit, wherein in the stowed position, the cover is disposed away from the interior frame, and wherein in the deployed position, the sidewalls are substantially parallel to and contact the interior frame.

2. The shelter of claim 1, wherein the at least two channels are at an oblique angle relative to the interior frame, and wherein the at least two slides are disposed at the oblique angle relative to an edge of the sidewalls that faces the interior frame.

3. The shelter of claim 1, wherein each channel of the at least two channels includes a first end and a second end, and the insert further includes a back plate coupled to the second end of the at least two slides, and wherein the back plate abuts the second end of each of the at least two channels in the stowed position.

4. The shelter of claim 1, wherein the sidewalls are tapered such that the sidewalls are larger proximate to the bottom of the cover than proximate the top of the cover.

5. The shelter of claim 1, wherein the opening in the cover has a width that is smaller than a width of the base plate and a height that is smaller than a height of the cover.

6. The shelter of claim 1, wherein the mount further includes a skirt coupled to the exterior frame, and wherein at least a portion of the skirt is disposed adjacent to the opening of the mount.

7. A wall mountable assembly for mounting an air handling unit to a wall, the wall mountable assembly comprising:

a mount including:
  a frame having an interior, an exterior, and an opening extending between the interior of the frame and the exterior of the frame;
  channels coupled to the frame and extending between a first end and a second end; and
an insert operably coupled to the mount and configured to transition between a stowed position and a deployed position, the insert including:
  a cover having a face plate, a top, a bottom, and tapered sidewalls extending between the top and the bottom;
  slides coupled to the face plate and disposed interior to the sidewalls, wherein the slides are configured to operably engage with the channels; and
  a base plate coupled to the slides,
wherein in the stowed position, the sidewalls are separated from the interior of the frame, and in the deployed position, the sidewalls are substantially flush with the interior of the frame.

8. The wall mountable assembly of claim 7, wherein the top, the bottom, and the sidewalls of the cover comprise a perimeter of the cover, and wherein the cover further includes a seal disposed around the perimeter and contacts the interior of the frame in the deployed position.

9. The wall mountable assembly of claim 7, wherein the opening includes:

a first portion having a first width that is substantially equal to a width of the base plate; and
a second portion having a second width that is larger than the first width.

10. The wall mountable assembly of claim 7, wherein the channels are disposed at an oblique angle between to the interior of the frame to the exterior of the frame.

11. The wall mountable assembly of claim 7, wherein the base plate includes one or more strips that run parallel to a length of the base plate.

12. The wall mountable assembly of claim 7, wherein the insert further includes a back plate coupled to the slides, and wherein in the stowed position, the back plate abuts the second end of the channels.

13. The wall mountable assembly of claim 12, wherein the back plate further includes at least one bumper.

14. The wall mount assembly of claim 7, wherein the slides are coupled to the cover interior to the sidewalls, and wherein the base plate is coupled to the cover interior to the bottom.

15. An assembly comprising
a mount including a pair of channels, each channel of the pair of channels having a first end and a second end; and
an insert operably coupled to the mount and configured to transition between a first position and a second position, the insert including:
  a pair of slides configured to engage with the pair of channels;
  a base plate coupled to the pair of slides;
  a cover including a front, a back, a top, a bottom, and sidewalls extending between the top and the bottom, wherein the back of the cover is coupled to the base plate and the pair of slides, and wherein the pair of slides and the base plate are disposed interior to the sidewalls;
  a back plate coupled to at least one of the pair of slides or the base plate, and wherein in the first position, the back plate abuts the second end of the pair of channels and in the second position, the back plate is spaced apart from the second end of the pair of channels; and,
wherein the mount further includes a frame having an opening sized to receive the insert, and the cover further includes an opening sized smaller than the opening in the frame.

16. The assembly of claim 15, wherein the top, the bottom, and the sidewalls are substantially parallel to and contact the frame in the second position.

17. The assembly of claim 15, wherein the mount further includes a frame disposed at the first end of the pair of channels, and wherein the pair of channels are disposed at an oblique angle relative to a plane defined by the frame.

18. The assembly of claim 15, wherein the sidewalls of the cover taper at an angle that corresponds to an angle of the pair of channels.

19. The assembly of claim 15, wherein the sidewalls are tapered such that the sidewalls are larger proximate to the bottom of the cover than proximate the top of the cover.

* * * * *